US012493991B2

(12) United States Patent
Le et al.

(10) Patent No.: US 12,493,991 B2
(45) Date of Patent: Dec. 9, 2025

(54) RECOVERING GAMUT COLOR LOSS UTILIZING LIGHTWEIGHT NEURAL NETWORKS

(71) Applicants: Adobe Inc., San Jose, CA (US); York University, Toronto (CA)

(72) Inventors: Hoang M. Le, Toronto (CA); Michael S. Brown, Toronto (CA); Brian Price, San Jose, CA (US); Scott Cohen, Sunnyvale, CA (US)

(73) Assignees: Adobe Inc., San Jose, CA (US); York University, Toronto (CA)

( * ) Notice: Subject to any disclaimer, the term of this patent is extended or adjusted under 35 U.S.C. 154(b) by 498 days.

(21) Appl. No.: 18/053,111

(22) Filed: Nov. 7, 2022

(65) Prior Publication Data
US 2024/0161344 A1 May 16, 2024

(51) Int. Cl.
*G06T 7/90* (2017.01)
*G06T 11/00* (2006.01)

(52) U.S. Cl.
CPC .............. *G06T 7/90* (2017.01); *G06T 11/001* (2013.01); *G06T 2207/10024* (2013.01); *G06T 2207/20081* (2013.01); *G06T 2207/20084* (2013.01); *G06T 2207/30168* (2013.01)

(58) Field of Classification Search
CPC ..................... G06T 7/90; G06T 11/001; G06T 2207/10024; G06T 2207/20081; G06T 2207/20084; G06T 2207/30168
See application file for complete search history.

(56) References Cited

U.S. PATENT DOCUMENTS

2017/0272619 A1* 9/2017 Finlayson ............ H04N 1/6052
2019/0213439 A1* 7/2019 Liu ........................... G06N 3/08

FOREIGN PATENT DOCUMENTS

JP H10257295 A * 9/1998
JP 2000165687 A * 6/2000

OTHER PUBLICATIONS

Bakke, A., Farup, I., Hardeberg, J.: Evaluation of algorithms for the determination of color gamut boundaries. Journal of Imaging Science and Technology 54(5), 50502-1 (2010).
Banic, N., Loncaric, S.: Unsupervised learning for color constancy. CoRR (2017).

(Continued)

*Primary Examiner* — Pinalben Patel
(74) *Attorney, Agent, or Firm* — Keller Preece PLLC

(57) ABSTRACT

Systems, methods, and non-transitory computer-readable media embed a trained neural network within a digital image. For instance, in one or more embodiments, the systems identify out-of-gamut pixel values of a digital image in a first gamut, where the digital image is converted to the first gamut from a second gamut. Furthermore, the systems determine target pixel values of a target version of the digital image in the first gamut that correspond to the out-of-gamut pixel values. The systems train a neural network to predict the target pixel values in the first gamut based on the out-of-gamut pixel values. The systems embed the neural network within the digital image in the second gamut to allow for extraction of the embedded neural network from the digital image to restore the digital image to a larger gamut digital image.

20 Claims, 14 Drawing Sheets

(56) References Cited

OTHER PUBLICATIONS

Bychkovsky, V., Paris, S., Chan, E., Durand, F.: Learning photographic global tonal adjustment with a database of input / output image pairs. In: CVPR (2011).
Chakrabarti, A., Scharstein, D., Zickler, T.E.: An empirical camera model for internet color vision. In: BMVC (2009).
Chakrabarti, A., Xiong, Y., Sun, B., Darrell, T., Scharstein, D., Zickler, T., Saenko, K.: Modeling radiometric uncertainty for vision with tone-mapped color images. IEEE TPAMI 36(11), 2185-2198 (2014).
Cheng, D., Prasad, D.K., Brown, M.S.: Illuminant estimation for color constancy: Why spatial-domain methods work and the role of the color distribution. JOSA-(A) 31(5), 1049-1058 (2014).
Commission, I.E.: IEC 61966-2-1 default RGB colour space—sRGB. IEC (1999).
Dang-Nguyen, D.T., Pasquini, C., Conotter, V., Boato, G.: Raise: A raw image dataset for digital image forensics. In: ACM Multimedia (2015).
Gong, H., Finlayson, G.D., Darrodi, M.M., Fisher, R.B.: Rank-based radiometric calibration. In: Color Imaging Conference (2018).
Isola, P., Zhu, J.Y., Zhou, T., Efros, A.A.: Image-to-image translation with conditional adversarial networks. In: CVPR (2017).
Karaimer, H.C., Brown, M.S.: A software platform for manipulating the camera imaging pipeline. In: ECCV (2016).
Kim, S.J., Lin, H.T., Lu, Z., Susstrunk, S., Lin, S., Brown, M.S.: A new in-camera imaging model for color computer vision and its application. IEEE TPAMI 34(12), 2289-2302 (2012).
Kingma, D.P., Ba, J.: Adam: A method for stochastic optimization. In: ICLR (2015). https://doi.org/10.1063/1.4902458.
Le, H., Afifi, M., Brown, M.S.: Improving color space conversion for cameracaptured images via wide-gamut metadata. Color and Imaging Conference (2020).
Le, H., Jeong, T., Abdelhamed, A., Shin, H.J., Brown, M.S.: GamutNet: Restoring wide-gamut colors for camera-captured images. Color and Imaging Conference (2021).
Liu, Y.L., Lai, W.S., Chen, Y.S., Kao, Y.L., Yang, M.H., Chuang, Y.Y., Huang, J.B.: Single-image HDR reconstruction by learning to reverse the camera pipeline. In: CVPR (2020).
Mccann, J.J.: Color gamut mapping using spatial comparisons. In: Color Imaging: Device-Independent Color, Color Hardcopy, and Graphic Arts VI (2000).
Micikevicius, P., Narang, S., Alben, J., Diamos, G., Elsen, E., Garcia, D., Ginsburg, B., Houston, M., Kuchaiev, O., Venkatesh, G., Wu, H.: Mixed precision training. In: ICLR (2018).
Mildenhall, B., Srinivasan, P.P., Tancik, M., Barron, J.T., Ramamoorthi, R., Ng, R.: Nerf: Representing scenes as neural radiance fields for view synthesis. In: ECCV (2020).
Morovic, J., Luo, M.R.: Evaluating gamut mapping algorithms for universal applicability. Color Research & Application 26, 85-102 (Dec. 2000).
Morovic, J.: Color gamut mapping. John Wiley & Sons (2008).
Nam, S., Kim, S.J.: Modelling the scene dependent imaging in cameras with a deep neural network. In: ICCV (2017).
Nguyen, R.M.H., Brown, M.S.: RAW image reconstruction using a self-contained sRGB-JPEG image with only 64 KB overhead. In: CVPR (2016).
Nguyen, R.M., Brown, M.S.: Raw image reconstruction using a self-contained sRGB-JPEG image with small memory overhead. IJCV 126(6), 637-650 (2018).
Nichol, A., Achiam, J., Schulman, J.: On first-order meta-learning algorithms. CoRR (2018), http://arxiv.org/abs/1803.02999.
Park, T., Liu, M.Y., Wang, T.C., Zhu, J.Y.: Semantic image synthesis with spatially-adaptive normalization. In: CVPR (2019).
Preiss, J., Fairchild, M.D., Ferwerda, J.A., Urban, P.: Gamut mapping in a highdynamic-range color space. In: Color Imaging XIX: Displaying, Processing, Hardcopy, and Applications (2014).
Punnappurath, A., Brown, M.S.: Spatially aware metadata for raw reconstruction. In: WACV (2021).
Rahaman, N., Baratin, A., Arpit, D., Draxler, F., Lin, M., Hamprecht, F., Bengio, Y., Courville, A.: On the spectral bias of neural networks. In: ICML (2019).
Shaham, T.R., Gharbi, M., Zhang, R., Shechtman, E., Michaeli, T.: Spatiallyadaptive pixelwise networks for fast image translation. In: CVPR (2021).
Sitzmann, V., Martel, J., Bergman, A., Lindell, D., Wetzstein, G.: Implicit neural representations with periodic activation functions. In: NeurIPS (2020).
Spaulding, K.E., Woolfe, G.J., Giorgianni, E.J.: Reference input/output medium metric rgb color encodings. In: Color Imaging Conference (2000).
Tancik, M., Mildenhall, B., Wang, T., Schmidt, D., Srinivasan, P.P., Barron, J.T., Ng, R.: Learned initializations for optimizing coordinate-based neural representations. In: CVPR (2021).
Tancik, M., Srinivasan, P., Mildenhall, B., Fridovich-Keil, S., Raghavan, N., Singhal, U., Ramamoorthi, R., Barron, J., Ng, R.: Fourier features let networks learn high frequency functions in low dimensional domains. In: NeurIPS (2020).
Wang, T.C., Liu, M.Y., Zhu, J.Y., Tao, A., Kautz, J., Catanzaro, B.: Highresolution image synthesis and semantic manipulation with conditional gans. In: CVPR (2018).

\* cited by examiner

| Method | Metadata↓ | RMSE↓ | RMSE OG↓ | PSNR↑ | PSNR OG↑ | Optim. Time↓ |
|---|---|---|---|---|---|---|
| *Conventional* | | | | | | |
| Clip | - | 0.0069 | 0.0126 | 43.22 | 37.98 | - |
| Soft Clip | - | 0.0039 | 0.0042 | 48.17 | 47.54 | - |
| *Pre-trained DNN* | | | | | | |
| Pix2pix | - | 0.0087 | 0.0167 | 41.24 | 35.55 | - |
| Pix2pixHD | - | 0.0157 | 0.0314 | 36.08 | 30.07 | - |
| ASAPNet | - | 0.0518 | 0.0993 | 25.72 | 20.06 | - |
| GamutNet | - | 0.0052 | 0.0088 | 45.75 | 41.08 | - |
| *Optimized per image* | | | | | | |
| ProPhoto-Sampled | 135 KB | 0.0032 | 0.0051 | 49.78 | 45.90 | - |
| SIREN | 796 KB | 0.0648 | 0.0421 | 23.77 | 27.52 | 115.67 mins |
| SIREN-residual | 796 KB | 0.0033 | 0.0044 | 49.72 | 47.20 | 118.98 mins |
| SIREN (small)-residual | 69 KB | 0.0040 | 0.0052 | 47.98 | 45.66 | 94.62 mins |
| MLP + enc. (no optimization) | 48 KB | 0.0021 | 0.0031 | 53.57 | 50.17 | 37.05 sec |
| MLP (53KB) + enc. | 53 KB | 0.0021 | 0.0030 | 53.73 | 50.33 | 16.29 sec |
| MLP (23KB) + enc. | 23 KB | 0.0021 | 0.0031 | 53.65 | 50.04 | 16.32 sec |
| MLP (53KB) + enc. + meta init. | 53 KB | 0.0021 | 0.0032 | 53.40 | 50.00 | 1.94 sec |
| MLP (23KB) + enc. + meta init. | 23 KB | 0.0021 | 0.0032 | 53.36 | 49.93 | 1.90 sec |

*Fig. 5*

| Method | RMSE↓ | RMSE OG↓ | PSNR↑ | PSNR OG↑ |
|---|---|---|---|---|
| MLP (53KB) + enc. + using xy | 0.0037 | 0.0048 | 48.57 | 46.38 |
| MLP (53KB) + enc. + using RGB | 0.0028 | 0.0045 | 51.10 | 46.98 |
| MLP (53KB) + enc. + using xyRGB | 0.0021 | 0.0031 | 53.65 | 50.04 |

Fig. 6B

RECOVERING GAMUT COLOR LOSS UTILIZING LIGHTWEIGHT NEURAL NETWORKS

BACKGROUND

Recent years have seen significant advancements in hardware and software platforms for capturing and processing digital images to display in high quality. For example, conventional systems capture high quality digital images and typically save and compress the high-quality digital images to conform to display requirements. For instance, conventional systems generally reduce the range of visible colors to standard RGB spaces via clipping to conform with file size concerns and optimization of digital image displays. While conventional systems provide some tools for capturing and processing digital images, such conventional systems nevertheless demonstrate are typically unable to accurately recover the lost color.

SUMMARY

One or more embodiments described herein provide benefits and/or solve one or more of problems in the art with systems, methods, and non-transitory computer-readable media that implement lightweight neural networks that recover gamut color loss. In particular, the disclosed system optimizes a lightweight neural network during gamut reduction to predict wide-gamut color values for clipped pixel values. The disclosed system saves parameters of lightweight neural network as metadata in the small-gamut image. To restore the wide-gamut color, the lightweight neural network is extracted and predicts the wide-gamut color values for the clipped pixels.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 5 illustrates an example table of quantitative results of various methods for restoring a digital image to a target version of the digital image compared to the gamut recovery system in accordance with one or more embodiments;

FIGS. 6A-6B illustrate results of ablation studies in accordance with one or more embodiments;

DETAILED DESCRIPTION

Figure 1:
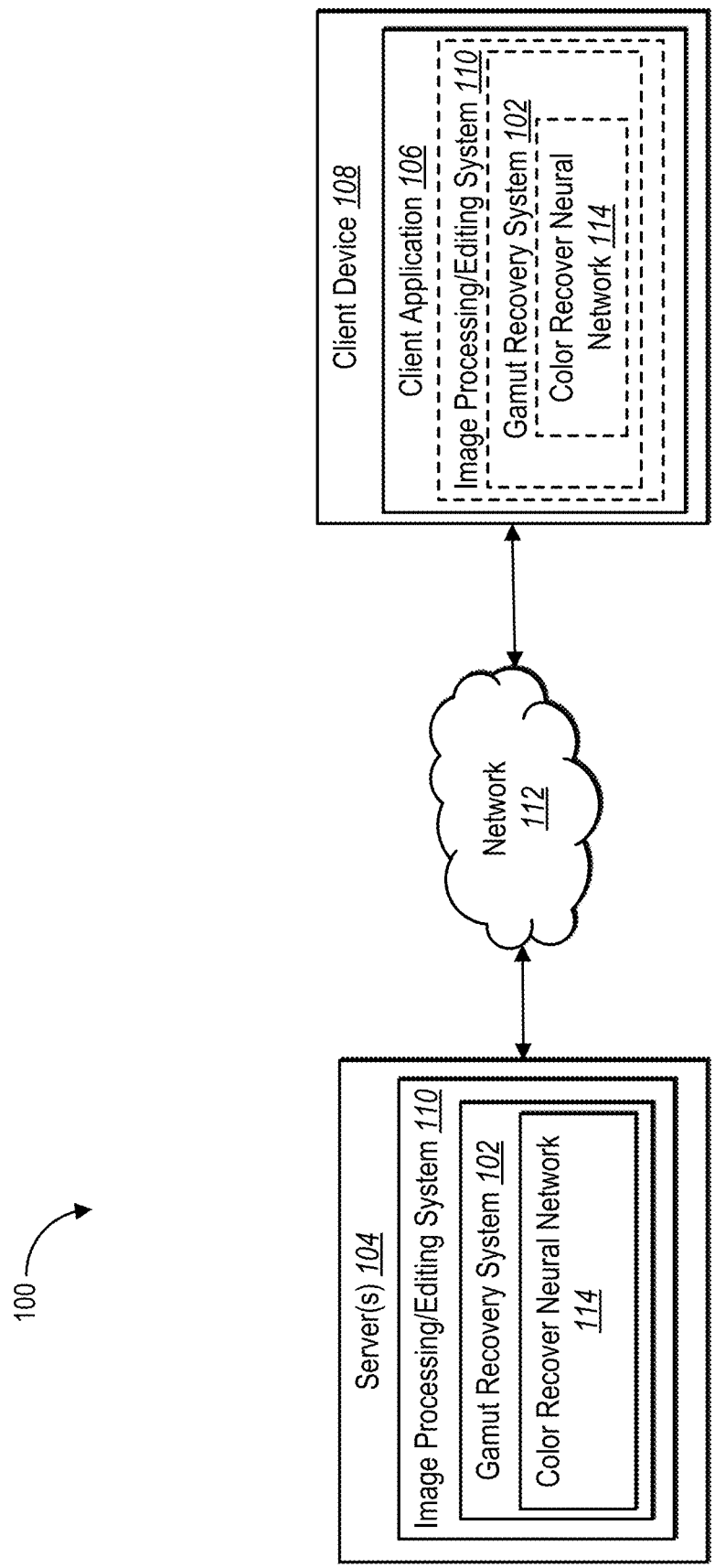
FIG. 1 illustrates an example environment in which a gamut recovery system operates in accordance with one or more embodiments.

One or more embodiments described herein include a gamut recovery system that includes lightweight neural networks that recover gamut color loss. To illustrate, the gamut recovery system restores a smaller gamut digital image to a larger gamut digital image utilizing a lightweight neural network learned during conversion of the digital image to the smaller gamut. In particular, the gamut recovery system trains or optimizes a lightweight (low-memory requirements) multi-layer perceptron (MLP) to predict pixel values (wide or larger gamut pixels values) from gamut-reduced pixel values and their corresponding spatial coordinates. Furthermore, the gamut recovery system embeds the MLP within the smaller gamut digital image. As such, when a larger gamut version of the smaller gamut digital image is desired, the gamut recovery system or other system extracts the MLP from the smaller gamut digital image and utilizes the MLP to predict larger gamut pixel values to replace likely out-of-gamut pixel values to restore the digital image to a larger gamut.

In one or more example embodiments, the gamut recovery system converts a target version of a digital image (i.e., a larger gamut version of the digital image) to a smaller gamut digital image. In particular, the gamut recovery system clips pixel values of the target version of the digital image within a determined range to generate a digital image having a smaller gamut. In one or more implementations, the gamut recovery system clips pixel values by performing at least one of a hard-clipping operation or a soft-clipping operation.

As also mentioned above, the gamut recovery system utilizes a lightweight MLP. Indeed, in some embodiments, the gamut recovery system trains a MLP to restore out of gamut pixels for a specific digital image. Specifically, for optimization purposes, the gamut recovery system trains the image specific MLP by updating parameters of a pre-trained model. For example, the gamut recovery system incorporates a MLP model previously trained on various training sets. In utilizing a pre-trained MLP, the gamut recovery system more efficiently optimizes the MLP for a specific digital image.

To train the MLP for a given digital image, the gamut recovery system converts the smaller gamut digital image to a larger gamut digital image and identifies out-of-gamut pixel values. For example, the gamut recovery system converts the smaller gamut digital image to the larger gamut digital image utilizing an inverse transform operation. The gamut recovery system identifies out-of-gamut pixel values and their spatial coordinates based on a comparison of the larger gamut digital image to the target digital image. Furthermore, the gamut recovery system also determines target pixel values from the target digital image that correspond with the out-of-gamut pixel values.

The gamut recovery system trains a multi-layer perceptron to predict target pixel values in the larger gamut from the out-of-gamut pixel values and their spatial coordinates. Specifically, the gamut recovery system utilizes the multi-layer perceptron to generate predicted target pixel values from the out-of-gamut pixel values and their spatial coordinates. The gamut recovery system determines a loss between the predicted target pixel values and the actual target pixel values from the target digital image. The gamut recovery system then updates the parameters of the MLP based on the loss. The gamut recovery system repeats this process until the MLP converges or the loss is within an acceptable range.

In one or more implementations, the gamut recovery system generates position informed encodings from the out-of-gamut pixel values and their spatial coordinates. The gamut recovery system utilizes the MLP to process the position informed encodings to predict target pixel values. For example, the gamut recovery system utilizes at least one of a sine or cosine function to generate the position informed encodings from the out-of-gamut pixel values and their spatial coordinates. The gamut recovery system uses the position informed encodings to increase efficiency and accuracy in generating predicted target pixel values utilizing the MLP.

In any event, once the MLP is trained for a specific digital image, the gamut recovery system embeds the MLP into the smaller gamut version of the digital image. For example, the gamut recovery system embeds the MLP into the metadata of the smaller gamut digital image. In one or more implementations, the gamut recovery system embeds the parameters of the MLP as a comment field in the metadata of the smaller gamut digital image.

To restore the smaller gamut digital image to the larger gamut, the gamut recovery system or another system extracts the MLP from the smaller gamut digital image. For example, the gamut recovery system extracts from a smaller gamut digital image an embedded neural network. In particular, the neural network includes a lightweight MLP. Further, the gamut recovery system converts the smaller gamut digital image to a larger gamut digital image (with an inverse transform function) and determines within the larger gamut digital image likely-out-of-gamut pixel values. Moreover, the gamut recovery system also determines spatial coordinates of the likely out-of-gamut pixel values. In one or more example embodiments, the gamut recovery system determines likely out-of-gamut pixel values by identifying pixels that were likely clipped. For instance, the gamut recovery system identifies saturated channel pixel values within the smaller gamut digital image to identify likely out-of-gamut pixel values.

Additionally, utilizing the extracted neural network, the gamut recovery system generates pixel value predictions in the larger gamut that correspond to the likely out-of-gamut pixel values and spatial coordinates. The gamut recovery system replaces the likely out-of-gamut pixel values in the larger gamut digital image with the pixel value predictions. For example, in one or more example embodiments, the gamut recovery system generates residuals for the pixel value predictions. In particular, by generating residuals, the gamut recovery system determines the difference between a likely out-of-gamut pixel value and predicted pixel value and adjusts the likely out-of-gamut pixel value based on the residual or difference. For instance, the gamut recovery system adds the generated residuals to the determined likely out-of-gamut pixel values to recover the color loss.

The gamut recovery system provides several advantages over conventional systems. For example, conventional systems suffer from several technological shortcomings that result in inaccurate and inefficient operations. Conventional systems often fail to operate accurately. For example, conventional systems process images in large gamuts (a.k.a. wide gamuts) that encompass a high percentage of visible colors, however conventional systems generally must reduce the large gamuts to fit within standard RGB (sRGB) color spaces (e.g., small gamuts, with a much lower percentage of visible colors). Conventional systems attempt to minimize color distortion that result from moving from the large gamut to the smaller gamut. To do so, conventional systems cut-off (hard clip) pixel values determined as not fitting within the smaller gamut for the sRGB. Further, when conventional systems desire to move from the smaller gamut (e.g., sRGB) back to the larger gamut (ProPhoto), conventional systems generally do so by blindly converting to a larger gamut by leaving the cut-off pixel values untouched. By blindly converting to the larger gamut and leaving the cut-off pixel values untouched, conventional systems suffer from inaccurate restorations of smaller gamut digital images to larger gamut digital images.

In other scenarios, conventional systems utilize a soft cut-off (soft clipping) approach. For instance, a soft cut-off for pixel values results in compressing out-of-gamut pixel values within the larger gamut digital image to fit within a smaller gamut (typically the sRGB gamut). Specifically, conventional system typically compress pixel values to fit within the outer 10% of the sRGB gamut. Conventional systems expand the pixel values within the smaller gamut to fit the larger gamut. In utilizing soft cut-off for pixel values, conventional systems suffer from incurring colorimetric error (inaccuracies) due to the compression during the gamut reduction phase.

In addition to the accuracy concerns mentioned above, conventional systems also suffer from efficiency concerns. For example, in utilizing various methods discussed above for reduction and expansion of a gamut, some conventional system methods result in a heavy memory footprint. In particular, some conventional systems attempt to store original RAW sensor image points within a smaller gamut digital image (e.g., sRGB). While conventional systems are able to store the original RAW sensor image points within the digital image to attempt to restore the smaller gamut digital image to a larger gamut, this results in inefficient and computationally heavy operations. As such, attempts to accurately restore smaller gamut digital images to larger gamut digital images is inefficient and a burden on computational memory resources. In sum, conventional systems suffer from a number of efficiency concerns due to memory and time constraints.

As alluded to above, the gamut recovery system operates more accurately than conventional systems. For example, by identifying out-of-gamut pixel values and spatial coordinates of the out-of-gamut pixel values, training a MLP to predict target pixel values, and embedding the MLP, the gamut recovery system has an accurate baseline to later generate pixel value predictions to restore a larger gamut digital image to a target version digital image. Rather than cutting-off pixel values and blindly converting to a larger gamut by leaving the cut-off pixel values untouched, the gamut recovery system identifies the mentioned out-of-gamut pixel values, spatial coordinates, and target pixel values of a target version to train an MLP. These inputs accurately inform and train the MLP to predict pixel values for a specific image. Accordingly, the gamut recovery system accurately restores smaller gamut digital images (sRGB) to larger gamut digital images (ProPhoto) with accurate pixel value predictions generated via the MLP.

The gamut recovery system provides for accurate gamut expansion unlike conventional systems which may utilize a soft cut-off for pixel values and suffer from colorimetric errors during gamut expansion. In particular, the gamut recovery system can identify likely out-of-gamut pixel values and not only hard clipped pixel values. When performing gamut expansion, the MLP can recover color loss for the soft clipped values in addition to any hard clipped values. In doing so, the gamut recovery system improves upon accuracy when undergoing gamut expansion.

In addition, the gamut recovery system operates with improved efficiency when compared to conventional systems. In particular, embedding the MLP within the digital image in the smaller gamut, the gamut recovery system conserves computational memory resources. For instance, unlike conventional systems that store original RAW sensor image points within the digital image, the gamut recovery system utilizes a lightweight MLP embedded within the metadata of the digital image. As a result, the gamut recovery system efficiently restores a smaller gamut digital image to a larger gamut digital image with accurate predicted pixel values of the target version of the digital image. Thus, the gamut recovery system improves upon conventional systems with regard to memory resources. For instance, to restore a digital image to a larger gamut (ProPhoto), the gamut recovery system embeds and later extracts a lightweight MLP within the digital image and the MLP only utilizes a small memory footprint (e.g., less than or equal to 50 KB).

As indicated by the foregoing discussion, the present disclosure utilizes a variety of terms to describe features and advantages of the multi-transaction dispute system. As mentioned above, the gamut recovery system converts from a smaller gamut digital image to a larger gamut digital image. For example, as used herein, the term "gamut" refers to a color space or range of colors (e.g., pixel values). In particular, a gamut spans a range of visible colors, and different gamut ranges cover different ranges of colors e.g., show different visible colors. To illustrate, an output display device selects a gamut based on the range of visible colors within a gamut that best conforms with the specifications of the display. Thus, a smaller gamut digital image refers to a gamut that covers a smaller range of visible pixel value colors while a larger gamut digital image refers to a gamut that covers a larger range of visible pixel value colors.

In one or more embodiments, a large or wide gamut refers to a color space that encompasses greater than fifty percent of visible colors. In other embodiments, a large or wide gamut refers to a color space that encompasses greater than sixty, seventy, or eighty percent of visible colors. An example large or wide gamut is ProPhoto. A small gamut refers to a color space that encompasses less than fifty percent of visible colors. In other embodiments, a small gamut refers to a color space that encompasses less than sixty, forty, or forty percent of visible colors. As example small gamut is sRGB.

As mentioned above, the gamut recovery system utilizes pixel values to represent colors. For example, as used herein the term "pixel value" refers to an addressable element in a raster image represented by one or more numerical values. In particular, a pixel value is an element of a picture represented on a display screen and the pixel value describes the brightness of the pixel and a color of the pixel. For example, a pixel includes RGB pixel values between 0 and 255. The gamut recovery system utilizes pixel value predictions to restore digital images to back to a target version with a larger gamut. The gamut recovery system utilizes pixel values. For example, as used herein, the term "out-of-gamut pixel values" refers to pixel values that have been changed to so as to fit within a smaller gamut. For instance, when converting a digital image from a larger gamut (e.g., ProPhoto) to a smaller gamut (e.g., sRGB) that has a gamut range that spans less visible colors, the pixel values are clipped to fix within the smaller gamut are referred to as "out-of-gamut pixel values." On the other hand, "likely out-of-gamut pixel values" refers to pixel values with a high probability of being out-of-gamut pixel values. For example, in one or more implementations, the gamut recovery system identifies pixels values that like close to the boundary of the small gamut as likely out-of-gamut pixel values.

In addition to the gamut recovery system identifying out-of-gamut pixel values, the gamut recovery system also identifies spatial coordinates. For example, as used herein, the term "spatial coordinates" refers to a group of numbers that indicates the position of a point in space. In particular, the term spatial coordinates refer to the position of a pixel within a digital image. For instance, as mentioned above, the gamut recovery system identifies out-of-gamut pixel values, in doing so, the gamut recovery system also identifies corresponding spatial coordinates for the out-of-gamut pixel values. Accordingly, the gamut recovery system utilizes both the value and the coordinate of the pixel to train the MLP to restore a digital image. As mentioned previously, the gamut recovery system generates position informed encodings. For example, as used herein the term "position informed encodings" refers to pixel values and spatial coordinates encoded together. In particular, position informed encodings include 'x' and 'y' coordinates of pixel encoded together with corresponding 'RGB' pixel values.

As mentioned above, the gamut recovery system determines target pixel values of a target version of a digital image. For example, as used herein the term "target version" refers to a version of the digital image to which the gamut recovery system restores a digital image. In some instances, the target version refers to a ground truth digital image or a baseline digital image for which to predict pixel values to replace within a digital image to restore the digital image. As also used herein, "target pixel values" refers to pixel values within the target version of the digital image.

As used herein, the term "neural network" refers to a type of machine learning model, which can be tuned (e.g., trained) based on inputs to approximate unknown functions used for generating the corresponding outputs. In particular, in some embodiments, a neural network refers to a model of interconnected artificial neurons (e.g., organized in layers) that communicate and learn to approximate complex functions and generate outputs based on a plurality of inputs provided to the model. In some instances, a neural network includes one or more machine learning algorithms. Further, in some cases, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, or a multi-layer perceptron. In some embodiments, a neural network includes a combination of neural networks or neural network components. A "multi-layer perceptron" refers to a fully connected class of feedforward artificial neural networks. In particular, the multi-layer perceptron includes multiple layers of perceptrons consisting of an input layer, a hidden layer, and an output layer. For instance, for the multi-layer perceptron each node besides the input node uses a nonlinear activation function and backpropagation for training.

As also mentioned above, the gamut recovery system performs a clipping operation. As used herein, the term "clipping operation" refers to an adjustment of one or more-pixel values within a digital image as part of converting an image from one gamut to another gamut. In particular, when converting between color spaces pixels values are projected from the larger gamut to the small gamut. Pixel values from the larger gamut that are outside of the smaller gamut (e.g., out of gamut pixels) are clipped to fit within the smaller gamut. For example, in the case of hard clipping, out of gamut pixels are clipped by projecting and moving them to a boundary of the smaller gamut. On the other hand, in the case of soft clipping, out of gamut pixels are soft clipped by compressing them to fit within a specified region of the smaller gamut (e.g., the outer ten percent of the smaller gamut).

Additional detail regarding the gamut recovery system will now be provided with reference to the figures. For example, FIG. 1 illustrates a schematic diagram of an exemplary system 100 in which gamut recovery system 102 operates. As illustrated in FIG. 1, the system 100 includes an image processing/editing system 110, server(s) 104, a network 112, and client device 108. Although the system 100 of FIG. 1 is depicted as having a particular number of components, the system 100 is capable of having any number of additional or alternative components (e.g., any number of servers, client devices, or other components in communication with the gamut recovery system 102 via the network 112). Similarly, although FIG. 1 illustrates a particular arrangement of the server(s) 104, the network 112, and the client device 108, various additional arrangements are possible.

The server(s) 104, the network 112, and the client device 108 are communicatively coupled with each other either directly or indirectly (e.g., through the network 112 discussed in greater detail below in relation to FIG. 10). Moreover, the server(s) 104 and the client device 108 include one or more of a variety of computing devices (including one or more computing devices as discussed in greater detail with relation to FIG. 10).

As mentioned above, the system 100 includes the server(s) 104. In one or more embodiments, the server(s) 104 generates, stores, receives, and/or transmits data including models, digital content, and recommendations for application features. In one or more embodiments, the server(s) 104 comprises a data server. In some implementations, the server(s) 104 comprises a communication server or a web-hosting server.

In one or more embodiments, the client device 108 includes computing devices that access, edit, segment, modify, store, and/or provide, for display, digital content such as digital images. For example, the client device 108 include smartphones, tablets, cameras, desktop computers, laptop computers, head-mounted-display devices, or other electronic devices. The client device 108 includes one or more applications (e.g., the client application 106) that access, edit, segment, modify, store, and/or provide, for display, digital content such as digital images. For example, in one or more embodiments, the client application 106 includes a software application installed on the client device 108. Additionally, or alternatively, the client application 106 includes a software application hosted on the server(s) 104 which are accessible by the client device 108 through another application, such as a web browser.

To provide an example implementation, in some embodiments, the gamut recovery system 102 on the server(s) 104 supports the gamut recovery system 102 on the client device 108. For instance, in some cases, the gamut recovery system 102 on the server(s) 104 pre-trains a color recovery neural network 114 (e.g., MLP) on a large corpus of images. The gamut recovery system 102 then, via the server(s) 104, provides the pre-trained color recovery neural network 114 to the client device 108. In other words, the client device 108 obtains (e.g., downloads) the pre-trained color recovery neural network 114 from the server(s) 104. Once downloaded, the gamut recovery system 102 on the client device 108 optimizes the color recovery neural network 114 for a specific image.

In alternative implementations, the image processing/editing system 110 includes a web hosting application that allows the client device 108 to interact with content and services hosted on the server(s) 104. To illustrate, in one or more implementations, the client device 108 accesses a software application supported by the server(s) 104. In response, the gamut recovery system 102 on the server(s) 104 optimizes the color recovery neural network 114 for a specific image based on received data from the client device 108. The server(s) 104 then provides the parameters of the optimized color recovery neural network 114 to the client device 108.

To illustrate, in some cases, the gamut recovery system 102 on the client device 108 identifies and determines out-of-gamut pixels, spatial coordinates, and target pixel values for a digital image. The client device 108 transmits the identified and determined data to the server(s) 104. In response, the gamut recovery system 102 on the server(s) 104 further trains the color recovery neural network 114 and provides the client device with the digital image with an embedded color recovery neural network 114.

Indeed, the gamut recovery system 102 is able to be implemented in whole, or in part, by the individual elements of the system 100. Indeed, although FIG. 1 illustrates the gamut recovery system 102 implemented with regard to the server(s) 104, different components of the gamut recovery system 102 are able to be implemented by a variety of devices within the system 100. For example, one or more (or all) components of the gamut recovery system 102 are implemented by a different computing device (e.g., the client device 108) or a separate server from the server(s) 104. Indeed, as shown in FIG. 1, the client device 108 includes the gamut recovery system 102. Example components of the gamut recovery system 102 will be described below with regard to FIG. 7.

Figure 2A:
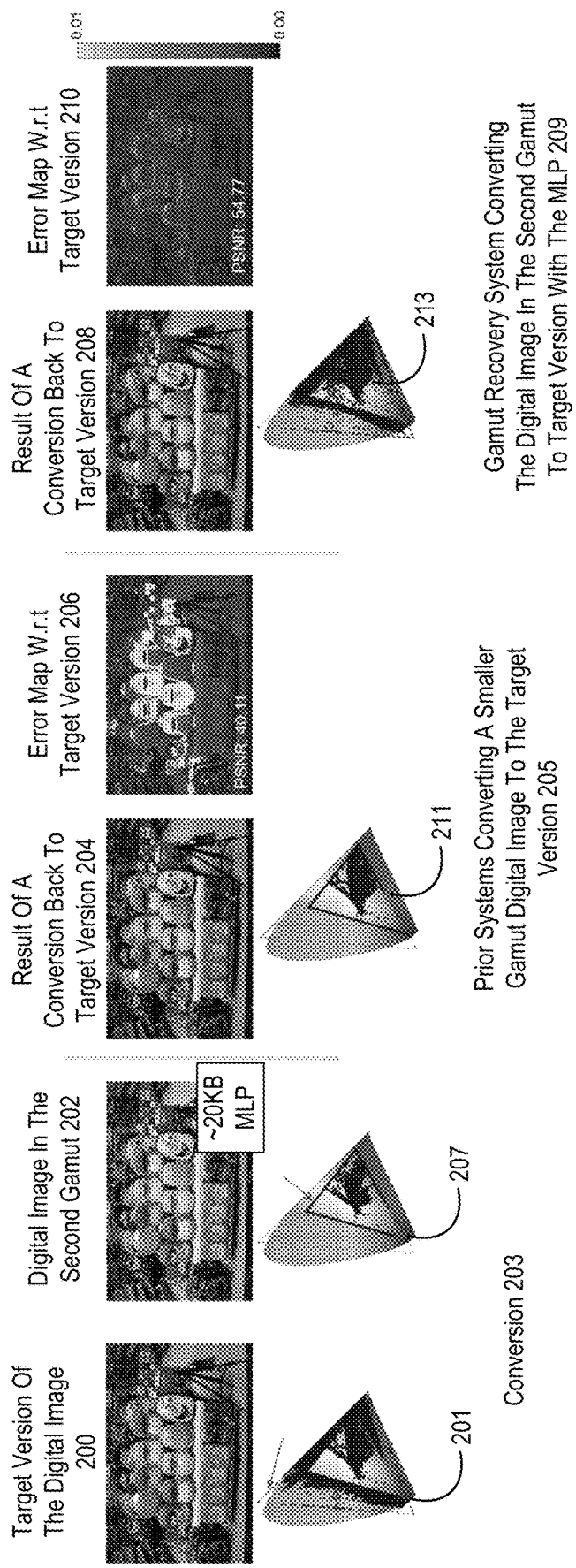
FIG. 2A illustrates an example overview comparison between the gamut recovery system converting a digital image to a target version and prior systems converting the digital image to the target version in accordance with one or more embodiments.

As mentioned, in one or more embodiments, the gamut recovery system 102 restores pixel values within a smaller gamut digital image to a target version 200 of the digital image (e.g., a version of the digital image in a wider gamut). As shown, FIG. 2A illustrates an overview example of the gamut recovery system 102 converting a digital image in a second gamut 202 (e.g., a smaller gamut) to a wider gamut compared to prior systems converting the digital image in the smaller gamut to the wider gamut. In particular, as discussed previously, the smaller gamut digital image includes a compressed version of the target version 200 of the digital image. More details relating to gamut reduction are discussed below in relation to the description of FIG. 3A.

As shown, FIG. 2A illustrates the target version 200 of the digital image. The target version 200 of the digital image, as already discussed above, acts as a baseline or ground truth version of the digital image. For example, FIG. 2A shows the gamut recovery system 102 receiving as input the target version 200 of the digital image and generating a digital image in the second gamut 202 via a conversion 203. In particular, FIG. 2A shows the target version 200 of the digital image (e.g., a larger gamut digital image) converted and saved as the digital image in the second gamut 202 (e.g., a smaller gamut digital image). FIG. 2A also shows a corresponding gamut below each of the versions of the digital image showing location of pixel values within the respective gamut. For example, below the target version 200 of the digital image is a target gamut 201 illustrating the location of the pixel values of the target version 200 of the digital image in the target gamut 201. Below the digital image in the second gamut 202 is a second gamut 207 illustrating the location of pixels of the digital image in the second gamut 202 within the second gamut 207. FIG. 2A illustrates clipping that takes place due to the conversion of the digital image from the target gamut 201 to the second gamut 207 (e.g., all of the pixels of the digital image in the second gamut 202 are located in the second gamut 207 due to projecting and clipping of the pixels of the target version 200 of the digital image from the target gamut 201 to the second gamut 201). Moreover, FIG. 2A indicates that the gamut recovery system 102 embeds an MLP within the digital image in the second gamut 202.

As further shown, FIG. 2A illustrates an act 205 of prior systems converting the digital image back to a larger gamut. In particular, the act 205 includes prior systems converting a smaller gamut digital image back to the target gamut. For instance, FIG. 2A shows a result 204 of the act 205 of conversion by prior systems and a corresponding gamut 211. Further, FIG. 2A shows an error map 206 with respect to the target version 200 of the digital image (e.g., errors incurred from prior systems converting the smaller gamut digital image to larger gamut with respect to the target version 200 of the digital image). The error map 206 indicates a peak signal-to-noise ratio of 40.11 (e.g., PSNR indicates a ratio of fidelity, where higher PSNR values indicate a higher quality of restoration). As indicated by the lighter shades in the error map 206, the act 205 of conversion from the smaller gamut digital image to the target version 200 of the digital image indicates a degree of error higher than that represented for the gamut recovery system 102 (discussed below). Moreover, as indicated by the gamut 211 corresponding with the result 204 of the conversion by prior systems, the pixel values remain inside the smaller gamut (e.g., the sRGB gamut space). In particular, due to clipping operations performed by prior systems to initially convert the target version 200 of the digital image to the digital image in the second gamut 202, the conversion back to the target version 200 remains inside the smaller gamut.

As mentioned, FIG. 2A also illustrates the gamut recovery system 102 converting the digital image in the second gamut 202 back to the larger gamut. For example, FIG. 2A illustrates an act 209 of converting the digital image in the second gamut 202 back to the target gamut utilizing the embedded MLP. More details relating to the MLP are given below in relation to the description of FIG. 3C. In particular, FIG. 2A illustrates a result 208 of conversion by the gamut recovery system 102 from the digital image in the second gamut 202 to the target gamut and a corresponding gamut 213. Further, FIG. 2A shows an error map 210 with respect to the target version of the digital image for the act 209. Specifically, the error map 210 shows a PSNR of 54.77 which indicates a higher quality of restoration as compared to the error map 206. Additionally, in comparing the gamut 213 corresponding to the result 208 with the gamut 211 corresponding with the result 204, FIG. 2A shows that the use of the MLP to restore the digital image in the second gamut 202 to the target version 200 restores the clipped pixel values within the larger gamut. When comparing to the target gamut corresponding with the target version 200 of the digital image, the gamut recovery system 102 has a much higher quality of restoration than prior systems. More details relating to gamut expansion are discussed below in relation to the description of FIG. 4.

Figure 2B:
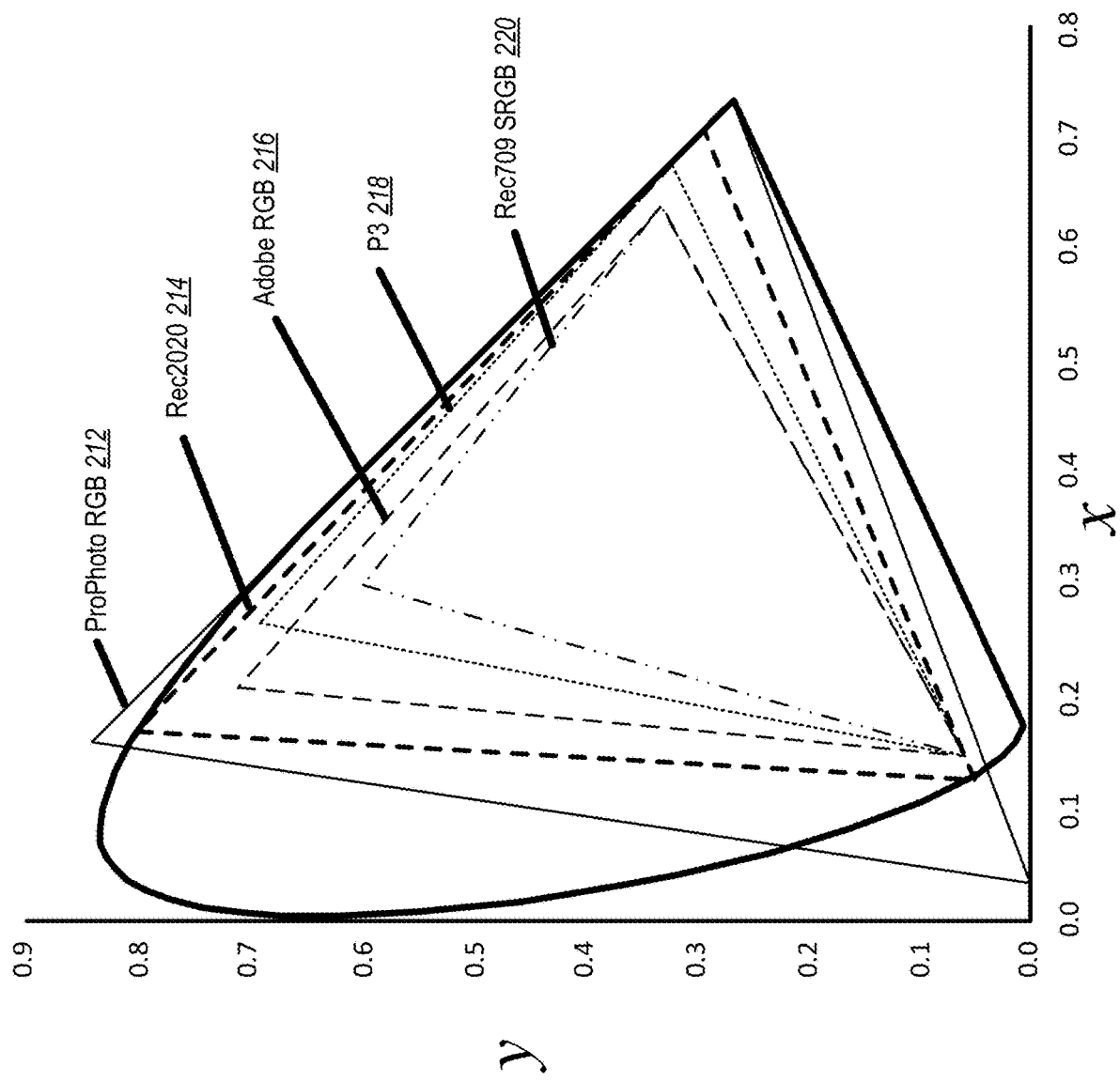
FIG. 2B illustrates an example overview of different color in accordance with one or more embodiments.

As mentioned above, the gamut recovery system 102 converts between various gamut ranges. As shown, FIG. 2B illustrates various gamuts that span different ranges of visible colors. As previously mentioned, a span of visible colors reproduced by RGB pixel values are called gamuts. As shown, FIG. 2B illustrates ProPhoto RGB 212, Rec2020 214, Adobe RGB 216, P3 218, and Rec709 sRGB 220. For example, the Rec709 sRGB 220 represents a standard RGB color space used by a vast majority of color image displays. In particular, the Rec709 sRGB 220 reproduces approximately 30% of the visible colors. Due to Rec709 sRGB 220 being the gamut to which a majority gamut images are saved to (even though modern color displays display a wider variety of visible colors), the convention of saving digital images to Rec709 sRGB 220 result in only viewing a small portion of visible colors. However, digital images are generally saved to Rec709 sRGB 220 for conserving memory resources, as Rec709 sRGB 220 occupies a smaller memory footprint than the other gamuts shown in FIG. 2B.

As further shown, FIG. 2B illustrates the ProPhoto RGB 212 (e.g., ProPhoto). For example, the ProPhoto RGB 212 encompasses a much larger gamut than the Rec709 sRGB 220. In particular, the ProPhoto RGB 212 has a capability of encompassing 90% of all visible colors. For instance, many image editing software applications utilize the ProPhoto RGB 212 gamut to manipulate digital images. For example, image editing software applications utilize the ProPhoto RGB 212 gamut for processing camera RAW-DNG files. In particular, due to the processing of images in a large gamut space such as ProPhoto RGB 212, image editing software applications provide for the option of saving a digital image in other gamuts. The other gamuts include the Rec2020 214, the Adobe RGB 216, and the P3 218, as shown in FIG. 2B. As indicated by FIG. 2B, these color gamuts are larger than the Rec709 sRGB 220 gamut. As already discussed above, converting a digital image from the ProPhoto RGB 212 gamut to the Rec709 sRGB 220 gamut utilizes gamut reduction and clipping operations to fit the larger gamut digital image within a smaller gamut. Likewise converting a digital image from the Rec2020 214, the Adobe RGB 216, and the P3 218 also utilize gamut reduction and clipping operations. As mentioned, details relating to gamut reduction and clipping is provided below.

Figure 3A:
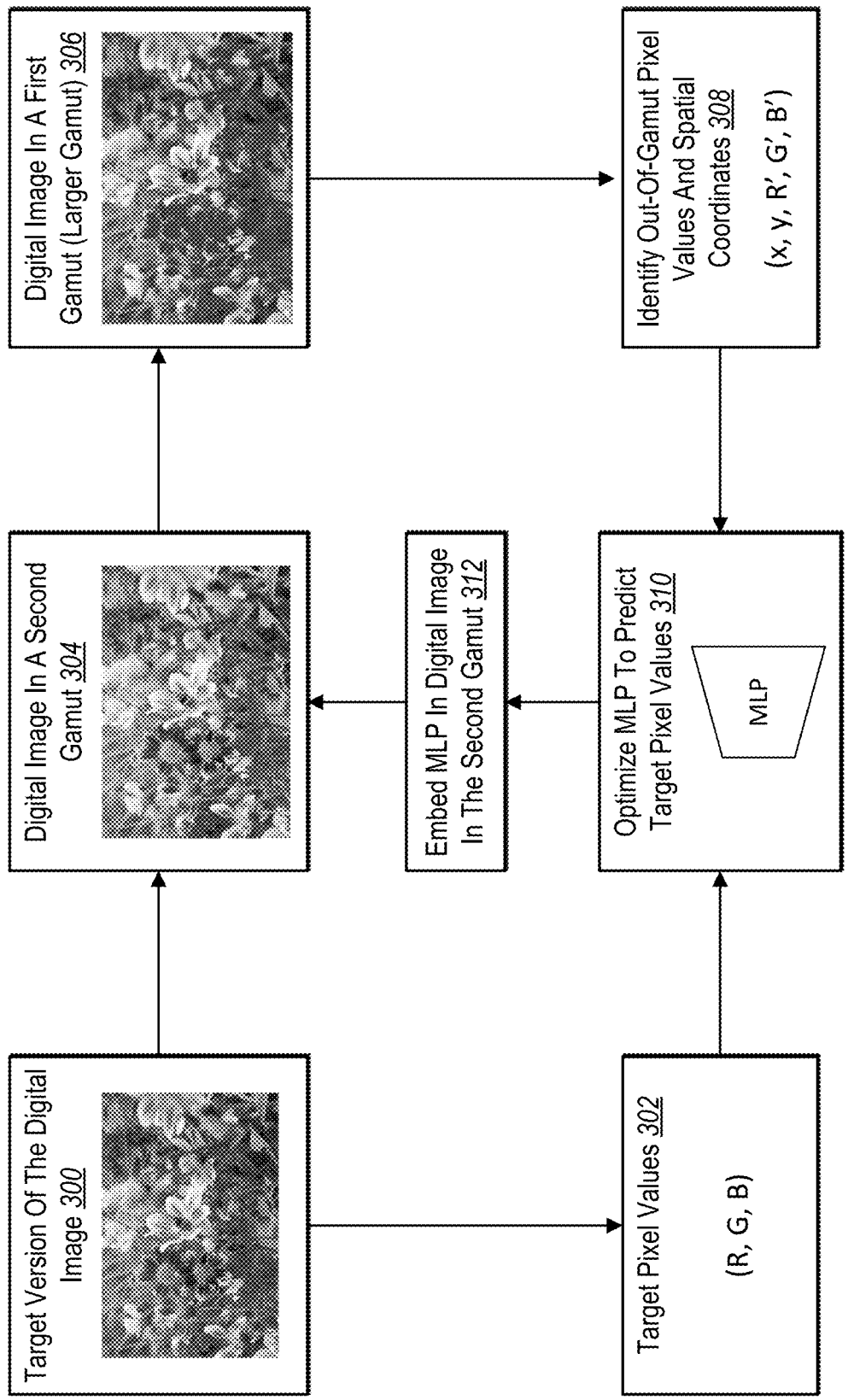
FIG. 3A illustrates an example diagram of the gamut recovery system performing gamut reduction in accordance with one or more embodiments.

As just mentioned, the gamut recovery system 102 performs a gamut reduction. As shown, FIG. 3A illustrates the gamut recovery system 102 identifying target pixel values and out-of-gamut pixel values and embedding an MLP within a digital image. For example, FIG. 3A illustrates a gamut reduction step of converting a larger gamut digital image (e.g., a target version 300 of the digital image) to a smaller gamut digital image (e.g., a digital image in a second gamut 304). The target version 300 and the digital image in the second gamut 304 were previously discussed in FIG. 2A.

As FIG. 3A shows, the gamut recovery system 102 receives as an input the target version 300 of the digital image. For example, the target version 300 of the digital image includes a wide-gamut ProPhoto RGB digital image (e.g., the ProPhoto RGB 212 gamut discussed in relation to FIG. 2B). To illustrate, the gamut recovery system 102 mathematically represents the target version 300 of the digital image as follows:

$$I_{pp} \in \mathbb{R}^{3 \times M}$$

where $I_{pp}$ (e.g., the ProPhoto digital image gamut or the target version 300 of the digital image) is an element of $\mathbb{R}$, where $\mathbb{R}$ represents the set of all real numbers. Furthermore, in the above equation, M represents the number of pixels.

As further shown by FIG. 3A, the gamut recovery system 102 converts the target version 300 of the digital image to the digital image in the second gamut 304. In particular, the gamut recovery system 102, in transforming the target version 300 of the digital image, utilizes a matrix to map pixel values. For instance, the gamut recovery system 102 utilizes a 3×3 matrix and a range of [0,1] such that in-gamut pixel values for the conversion fall within the established [0,1] range. In one or more example embodiments, the pixel values within the [0,1] range are in-gamut for the digital image in the second gamut 304 (e.g., Rec709 sRGB 220 discussed in FIG. 2B). Furthermore, the gamut recovery system 102 identifies a range for out-of-gamut pixel values. For example, this includes the range outside of the [0,1] range for in-gamut pixel values. In particular, the gamut recovery system 102 identifies the pixel values in the range for out-of-gamut pixel values and clips the pixel values from digital image, resulting in the digital image in the second gamut 304. In addition to clipping the pixel values, the gamut recovery system 102 processes the in-gamut pixel values (e.g., within the [0,1] range) with a gamma encoding. The gamut recovery system 102 produces the digital image in the second gamut 304 (e.g., an sRGB digital image) by clipping and gamma encoding. This process is represented by the following algorithm:

$$I_{sRGB} = g(\text{Clip}(MI_{pp}, \min=0, \max=1))$$

Where M is the matrix that maps between the target version 300 (e.g., ProPhoto gamut) of the digital image and the unclipped version of the digital image (e.g., unclipped sRGB). Furthermore, the above equation indicates clip( ) as a clipping operation performed on the unclipped version of the digital image and g as the gamma-encoding performed following the clipping operation.

In one or more example embodiments, the gamut recovery system 102 performs at least one of hard-clipping or soft-clipping. Hard-clipping and soft-clipping were previously discussed. In one or more embodiments, the gamut recovery system 102 utilizes only hard-clipping. In other embodiments, the gamut recovery system 102 utilizes only soft-clipping. In alternative implementations, the gamut recovery system 102 utilizes a combination of hard-clipping and soft-clipping.

As further illustrated by FIG. 3A, the gamut recovery system 102 subsequently converts the digital image in the second gamut 304 back to the larger gamut of the target version 300 of the digital image. For example, the gamut recovery system 102 converts the digital image in the second gamut 304 to a digital image in a first gamut 306. In particular, the gamut recovery system 102 produces a digital image with the previously clipped pixel values remaining lost. Accordingly, the gamut recovery system in performing the conversion from the second gamut 304 to the first gamut 306 produces a digital image with a larger gamut with clipped pixel values. This process is represented by the following algorithm:

$$I_{ClippedPP} = M^{-1} g^{-1}(I_{sRGB})$$

Where $g^{-1}$ represents a degamma function for the input of the digital image in the second gamut 304 and $M^{-1}$ as an inverse transform to convert the digital image in the second gamut 304 to the digital image in the first gamut 306. Accordingly, the inverse transform expands the gamut of the digital image in the second gamut 304 to match the gamut range of the target version 300 of the digital image, however the expanded gamut in the first gamut 306 has the clipped values rather than the actual target pixel values.

As also shown in FIG. 3A, the gamut recovery system 102 performs an act 308 of identifying out-of-gamut pixel values and their spatial coordinates. For example, the gamut recovery system 102 compares the digital image in the first gamut 306 to the target version 300 of the digital image and identifies the pixels that have been clipped (e.g., pixels that have different pixels values from the target version 300 of the digital image). Similarly, the gamut recovery system 102 identifies target pixels values 302 from the target version 300 of the digital image (e.g., the values of the out-of-gamut pixel values before they were clipped).

The gamut recovery system 102 performs an act 310 of optimizing the MLP to predict the target pixel values from the out-of-gamut pixel values and their spatial coordinates. For example, the MLP receives as input the identified out-of-gamut pixel values and the corresponding spatial coordinates. In particular, utilizing the identified out-of-gamut pixel values and the corresponding spatial coordinates, the MLP outputs a prediction for target pixel values. In one or more example embodiments, the gamut recovery system 102 determines a loss between the predicted target pixel values and the actual target pixel values 302. In particular, the gamut recovery system 102 utilizes a loss function to make a comparison between the predicted target pixel values and the target pixel values 302. In one or more implementations, the gamut recovery system 102 utilizes a least square errors (L2) loss function. The gamut recovery system 102 then updates the parameters of the MLP based on the loss. The gamut recovery system 102 repeats this process until the MLP converges or the predicted pixel values are within an acceptable threshold of the target pixel values 302.

The gamut recovery system 102 utilizes the MLP to predict target pixel values. In one or more implementations, the gamut recovery system 102 does so by generating residual values. For example, the gamut recovery system 102 utilizes the MLP to generate residual values comprising a difference between the out-of-gamut pixel values (e.g., the clipped values) and target pixel values 302. In particular, the MLP predicts a residual value to add to the digital image in the first gamut 306 to restore it back to the target version 300.

As further shown in FIG. 3A, the gamut recovery system 102 performs an act 312. For example, the act 312 includes embedding the MLP in the digital image in the second gamut 304. In particular, the gamut recovery system 102 saves the digital image in the second gamut 304 with the embedded MLP. In one or more example embodiments, the gamut recovery system 102 performs the act 312 of embedding the MLP when the computing device saves the digital image in the second gamut 304. In particular, the MLP requires a small memory footprint (e.g., less than or equal to 20 KB) when embedded within a digital image. For instance, the gamut recovery system 102 embeds the MLP within the metadata of the digital image file 304. Furthermore, in one or more embodiments the gamut recovery system 102 embeds the MLP as a comment field within the digital image of the second gamut 304.

Figure 3B:
FIG. 3B illustrates an example diagram of the gamut recovery system identifying out-of-gamut pixel values in the gamut recovery system in accordance with one or more embodiments.

As mentioned above, the gamut recovery system 102 identifies out-of-gamut pixel values. FIG. 3B illustrates the gamut recovery system 102 identifying out-of-gamut pixel values in accordance with one or more embodiments. For example, FIG. 3B shows a clipping operation 314. In particular, FIG. 3B shows a digital image in a smaller gamut 316 based on the clipping operation 314. For instance, in connection with converting the digital image into the smaller gamut 316, the gamut recovery system 102 generates an out-of-gamut mask 318. As previously discussed, (in relation to FIG. 3A), the gamut recovery system 102 identifies a range for the out-of-gamut pixel values when mapping pixel values of a gamut to a matrix. FIG. 3B further illustrates this concept. For example, FIG. 3B shows a color cube corresponding with the out-of-gamut mask. In particular, the gamut recovery system 102 identifies out-of-gamut pixel values utilizing the color cube. For instance, the gamut recovery system 102 maps the pixel values of the digital image in the smaller gamut 316 to the color cube. Moreover, the gamut recovery system 102 determines that pixel values on the boundary of the color cube are out-of-gamut pixel values.

In particular, the gamut recovery system 102 computes the out-of-gamut mask 318 for all pixel values on the boundary of the smaller gamut 316 color space (e.g., the sRGB color space). For example, FIG. 3B shows the gamut recovery system 102 generating the out-of-gamut mask corresponding to the digital image in the smaller gamut 316 that represents in-gamut vs. out-of-gamut pixel values. In particular, the gamut recovery system 102 determines that any pixel values with one or more saturated color channels is considered out-of-gamut or likely out-of-gamut.

In one or more example embodiments, the gamut recovery system 102 utilizes the process of FIG. 3B (e.g., out-of-gamut mask) for identifying out-of-gamut pixel values in digital images where the gamut recovery system 102 does not have a baseline of the clipped pixel values or the target version of the digital image. In particular, digital images saved in a smaller gamut contain the embedded MLP but not the target version of the digital image. As a result, when a gamut expansion of the digital image in the smaller gamut is performed, the gamut recovery system 102 generates an out-of-gamut mask to determine likely out-of-gamut pixel values. Furthermore, the pixel values within the out-of-gamut mask 318 represent likely clipped values from the target version of the digital image due to the pixel values being on the outside of the smaller gamut 316. The gamut recovery system 102 utilizes the out-of-gamut mask 318 for sampling pixel values during optimization of the MLP and during recovery (e.g., expansion). More details of the gamut recovery system 102 determining likely out-of-gamut pixel values is discussed below in the discussion of FIG. 4.

Figure 3C:
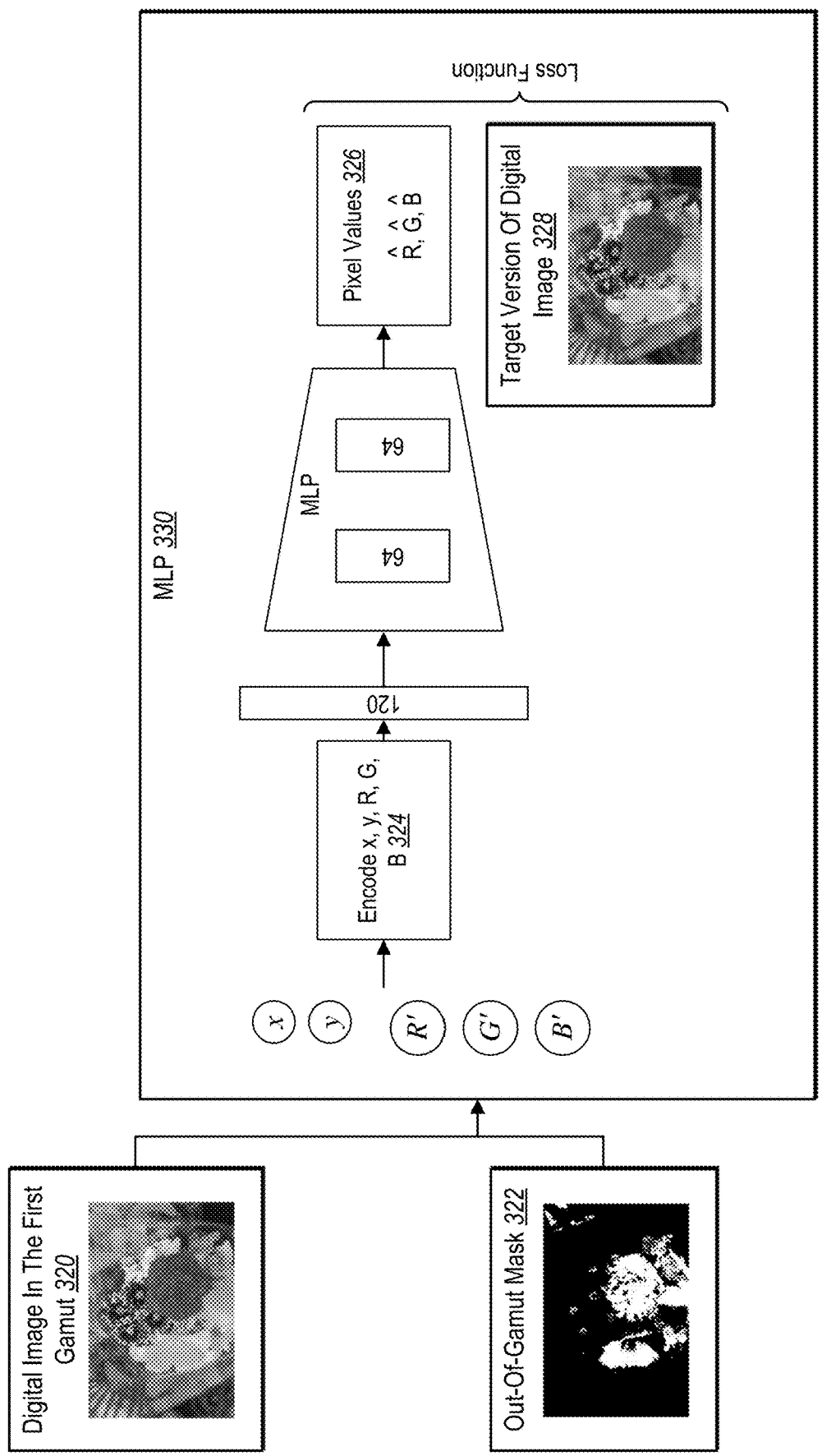
FIG. 3C illustrates an example diagram of a multi-layer perceptron and the gamut recovery system performing optimization of the multi-layer perceptron in accordance with one or more embodiments.

As mentioned above, the gamut recovery system 102 optimizes the MLP by updating parameters within the layers of the MLP. For example, FIG. 3C illustrates an example architecture of the MLP 330 of the gamut recovery system 102. In particular, FIG. 3C shows the MLP 330 as including multiple layers. In alternative implementations, the MLP 330 includes more or less layers. For example, the MLP 330 can include ten, nine, eight, seven, five, four, three, or two layers etc. The gamut recovery system 102 provides the digital image in a first gamut 320 and an out-of-gamut mask 322 as input to the MLP 330. The digital image in the first gamut 320 includes the clipped pixel values of the target version in a digital image (e.g., $I_{ClippedPP}$).

As further shown by FIG. 3C, the gamut recovery system 102 receives a 5-dimensional input (e.g., the RGB values and the spatial coordinates) of the out-of-gamut pixels, represented in FIG. 3C as 'x', 'y', and R', G', and B'. In particular, the gamut recovery system 102 performs an act 324 of encoding the 5-dimensional input as a 120-dimension feature vector (e.g., a multi-dimensional feature vector) before passing the 120-dimension feature vector to the MLP 330. To illustrate, the gamut recovery system 102 performs the act 324 of encoding the 5-dimensional input with an encoding function. Moreover, the gamut recovery system 102 utilizes the encoding function to encode the 5-dimensional input into a representation that is more amenable to the MLP 330.

More specifically, the gamut recovery system 102 normalizes the 5-dimensional coordinate and color input values to a range of [−1,1]. Furthermore, the gamut recovery system 102 encodes the normalized input values utilizing an encoding function (e.g., a sine and/or cosine function). As mentioned, the use of the encoding function improves neural implicit representation optimization. In one or more implementations, the gamut recovery system 102 utilizes the following encoding function:

$$\gamma(m) = (\sin(2^0 \pi m), \cos(2^0 \pi m), \ldots, \sin(2^{k-1} \pi m), \cos(2^{k-1} \pi m))$$

In the above equation, the γ function projects each of the 5-dimensional input coordinates to a 24-dimensional encoding which results in a final 120-dimensional feature vector for each input. Furthermore, m represents the spatial coordinate or clipped pixel value. Furthermore, in the above equation there are ten equally spaced frequencies for the sine and cosine basis ranging from zero to three.

As shown, FIG. 3C illustrates the MLP 330 with two layers. For example, the MLP 330 utilizes two fully connected layers. In particular, the two fully connected layers include ReLu layers with output features. For instance, FIG. 3C shows the first layer as a 64-dimensional feature vector and the last layer of the MLP 330 also as a 64-dimensional feature vector. Further, the final 64-dimensional feature vector layer predicts a residual to add to the R', G', B' input. To illustrate, the first and second layer of the MLP 330 represents N-features linear layer's output vectors with ReLu. Moreover, the last layer of the MLP 330 includes no activation function. The MLP 330 is expressible as follows:

$$\hat{I}_{pp}(x) = f_\theta(x, I_{ClippedPP}(x)) + I_{ClippedPP}(x)$$

In the above algorithm, $f_\theta$ represents the MLP 330, where θ represents the parameters of the MLP 330. $\hat{I}_{pp}(x)$ represents the final recovered pixel values (e.g., the predicted target pixel values to restore the digital image in the first gamut 320 to the target version 328 of the digital image).

As shown by FIG. 3C, the gamut recovery system 102 utilizes the MLP 330 to generate predicted pixel values 326 and compares the predicted pixel values 326 with corresponding pixels values from the target version 328 of the digital image utilizing a loss function. For example, the gamut recovery system 102 utilizing the following loss function in one or more implementations:

$$L_{gamut} = \sum_{x} \|(\hat{I}_{pp}(x) - I_{pp}(x))\|_2^2$$

Based on the determined loss, the gamut recovery system 102 updates the parameters of the MLP 330. The gamut recovery system 102 repeats this processes until the predicted pixel values 326 are within an acceptable threshold of the pixels values from the target version 328 to optimize the MLP 330 for the digital image in the first gamut 320.

Figure 4:
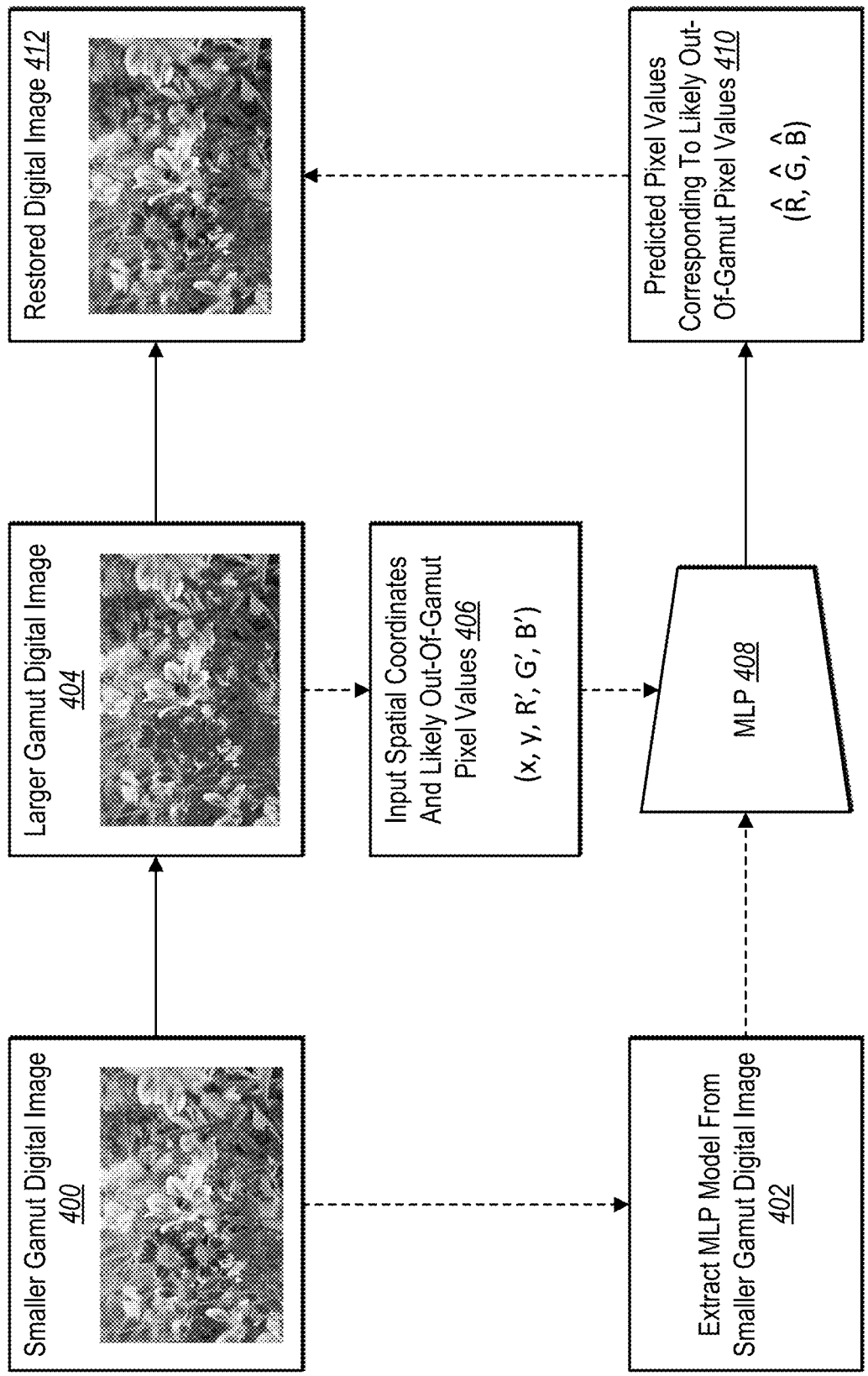
FIG. 4 illustrates an example diagram multi-layer perceptron gamut expansion in accordance with one or more embodiments.

FIG. 4 illustrates the gamut recovery system 102 performing gamut expansion of the digital image. In particular, FIG. 4 illustrates the gamut recovery system 102 expanding a smaller gamut 400 digital image into a restored digital image 412 via a MLP 408. In particular, FIG. 4 illustrates, the gamut recovery system 102 expanding the smaller gamut 400 digital image and recovering more colors corresponding to a target version of the digital image.

As shown in FIG. 4, the gamut recovery system 102 performs an act 402. For example, the act 402 includes extracting the MLP 408 from the smaller gamut 400 digital image. In particular, the gamut recovery system 102 extracts the MLP 408 from the metadata field of the digital image. For instance, the gamut recovery system 102 extracts the MLP model 408 as a bitstream from the smaller gamut 400 digital image. To reiterate, the extracted MLP model 408 from the smaller gamut 400 digital image is tailored/optimized/trained specifically for the smaller gamut 400 digital image.

In one or more example embodiments, the gamut recovery system 102 performs the act 402 of extracting the MLP model 408 from the smaller gamut 400 digital image based on input from a computing device. In particular, a computing device accesses the smaller gamut 400 digital image and expressly indicates to the gamut recovery system 102 to expand to a larger gamut 404 digital image. For instance, the gamut recovery system 102 receives a selection of an option for the smaller gamut 400 digital image to undergo gamut expansion.

In one or more example embodiments, the gamut recovery system 102 performs the act 402 of extracting the MLP model 408 from the smaller gamut 400 digital image based on importing the smaller gamut 400 digital image into an image editing software application. In particular, the gamut recovery system 102 receives an indication of an image editing software application utilizing the smaller gamut 400 digital image and this indication triggers the gamut recovery system 102 to undergo gamut expansion.

As further shown in FIG. 4, the gamut recovery system 102 converts the smaller gamut 400 digital image to the larger gamut 404 digital image. For example, the gamut recovery system 102 converts the smaller gamut 400 to the larger gamut 404 based on performing a standard color space conversion to compute the clipped values within the smaller gamut 400 digital image. In particular, as already discussed in relation to FIG. 3A, the gamut recovery system 102 utilizes the following equation to convert the smaller gamut 400 to the larger gamut 404:

$$I_{ClippedPP} = M^{-1}g^{-1}(I_{sRGB})$$

As already discussed in relation to FIG. 3B, the gamut recovery system 102 considers any pixel values that lie close to the [0,1] boundary as likely out-of-gamut or previously clipped pixel values. For instance, as shown in FIG. 4, the MLP model 408 performs an act 406. The gamut recovery system 102 identifies likely out-of-gamut pixel values and their spatial coordinates.

Furthermore, FIG. 4 illustrates the larger gamut 404 digital image converted to the restored digital image 412. For example, as shown in FIG. 4, the gamut recovery system 102 performs an act 410 via the MLP model 408. In particular, the act 410 includes predicting target pixel values corresponding to the likely out-of-gamut pixel values. For instance, based on the predicted target pixel values, the gamut recovery system 102 generates the restored digital image 412. As already discussed above, in one or more embodiments, the gamut recovery system 102 predicts the residual from the larger gamut 404 digital image to the target pixel values and adds the residual values to the larger gamut 404 digital image (e.g., the clipped values) to recover the color values.

Although FIGS. 3A-4 illustrate the gamut recovery system 102 performing a series of acts to restore digital image gamuts, in one or more example embodiments, the gamut recovery system 102 performs the series of acts to restore gamuts for digital streams, e.g., videos. In particular, the gamut recovery system 102 performs the aforementioned principles and acts in regard to digital streams. For instance, the gamut recovery system 102 embeds the MLP model 408 within a reduced gamut of a digital stream. To illustrate, the gamut recovery system 102 in addition to identifying spatial coordinates and pixel values, the gamut recovery system 102 also identifies a frame of the digital stream. In doing so, the inputs include (x, y, t, R, G, B) where 't' represents a specific frame of the digital stream.

As previously mentioned, the gamut recovery system 102 makes improvements in restoring smaller gamut digital images to target version digital images compared to prior systems. For example, the gamut recovery system 102 integrates the trained MLP at the gamut reduction step when the digital image is converted to a smaller gamut (e.g., sRGB) and the gamut recovery system 102 optimizes the MLP 408 directly against a known restoration target (e.g., the target version of the digital image). In contrast, prior systems of digital image restoration do not optimize models directly against a known restoration target. Moreover, the small size of the MLP 408 embedded within the smaller gamut digital image provides efficiency and accuracy improvements in digital image restoration.

The quantitative results discussed below in relation to FIG. 5 show significant improvements over pre-trained DNN models used for color recovery. Furthermore, the gamut recovery system 102 also illustrates high performance in PSNR as compared to larger neural implicit function, however the advantage of the gamut recovery system 102 includes a significantly smaller memory footprint and optimization time. For example, as previously shown in FIG. 2A, the gamut recovery system 102 shows a qualitative comparison between a predicted output of prior systems and a predicted output of the gamut recovery system 102 with a ground truth baseline. In some embodiments, the gamut recovery system 102 utilizes a predicted output of prior systems and the predicted output of the gamut recovery system 102 utilizes meta initialization. In some embodiments, a comparison between the predicted output of prior systems and the gamut recovery system 102, the gamut recovery system 102 has improved root-mean-square deviation (RMSE) with the highest PSNR (indicating highest quality digital image restoration) and a corresponding gamut that matches with the ground truth better than the prior systems.

As mentioned above, FIG. 5 illustrates quantitative results of the gamut recovery system 102 compared to prior systems 500a-500i. In making quantitative comparisons, prior systems 500a-500i and the gamut recovery system 102 utilized sets of digital images for training as well as testing results for comparison. In particular, a set of RAW images from a variety of datasets are utilized for both the gamut recovery system 102 and the prior systems 500a-500j. For instance, for both the gamut recovery system 102 and the prior systems 500a-500j, the RAW images are rendered to a 16-bit ProPhoto. Moreover, a sub-set of the digital image datasets are utilized for training and another subset is used for testing. Additionally, all digital images in the datasets include at least 10% out-of-gamut pixel values, e.g., 10% of the pixel values are clipped when converting to a smaller gamut (the sRGB digital image). In one or more embodiments, the out-of-gamut pixels range from 10.12% of the pixel values to 24.75%.

FIG. 5 illustrates a table with metadata space 504, a root-mean-square error (RMSE) 506, out-of-gamut RMSE 508, a peak signal to noise ratio (PSNR) 510 between predicted and ground truth test digital images, out-of-gamut PSNR 512, and optimization time 514. In particular, FIG. 5 illustrates the table with the prior systems 500a-500j and the gamut recovery system 102 with a variety of different MLP implementations 502a-502e. For example, FIG. 5 shows Pix2pix 500c (Isola, P., Zhu, J. Y., Zhou, T., Efros, A. A.: Image-to-image translation with conditional adversarial networks. In: CVPR (2017)), Pix2pixHD 500d (Wang, T. C., Liu, M. Y., Zhu, J. Y., Tao, A., Kautz, J., Catanzaro, B.: High-resolution image synthesis and semantic manipulation with conditional GANS. In: CVPR (2018)), ASAPNet 500e (Shaham, T. R., Gharbi, M., Zhang, R., Shechtman, E., Michaeli, T.: Spatially-adaptive pixelwise networks for fast image translation. In: CVPR (2021)), GamutNet 500f (Le, H., Jeong, T., Abdelhamed, A., Shin, H. J., Brown, M. S.: GamutNet: Restoring wide-gamut colors for camera-captured images. Color and Imaging Conference (2021)), ProPhoto-Sampled 500g (Le, H., Afifi, M., Brown, M. S.: Improving color space conversion for camera-captured images via wide-gamut metadata. Color and Imaging Conference (2020)), and SIREN 500h (Sitzmann, V., Martel, J., Bergman, A., Lindell, D., Wetzstein, G.: Implicit neural representations with periodic activation functions. In: NeurIPS (2020)). Furthermore, the table in FIG. 5 further shows SIREN-residual and SIREN (small)-residual.

For instance, as shown in the table of FIG. 5, the gamut recovery system 102 with the variety of different MLP implementations 502a-502e perform far more superior to the prior systems 500a-500j. Specifically, the table shows the MLP implementations 502a-502e with the metadata space 504 (23 KB-53 KB) significantly smaller than ProPhoto-Sampled 500g and SIREN 500h (135 KB-796 KB). Furthermore, the RMSE, PSNR and optimization time for the MLP implementations 502a-502e are significantly superior (1.90 seconds-16.32 seconds) to SIREN 500h (115.67 minutes).

Figure 6A:
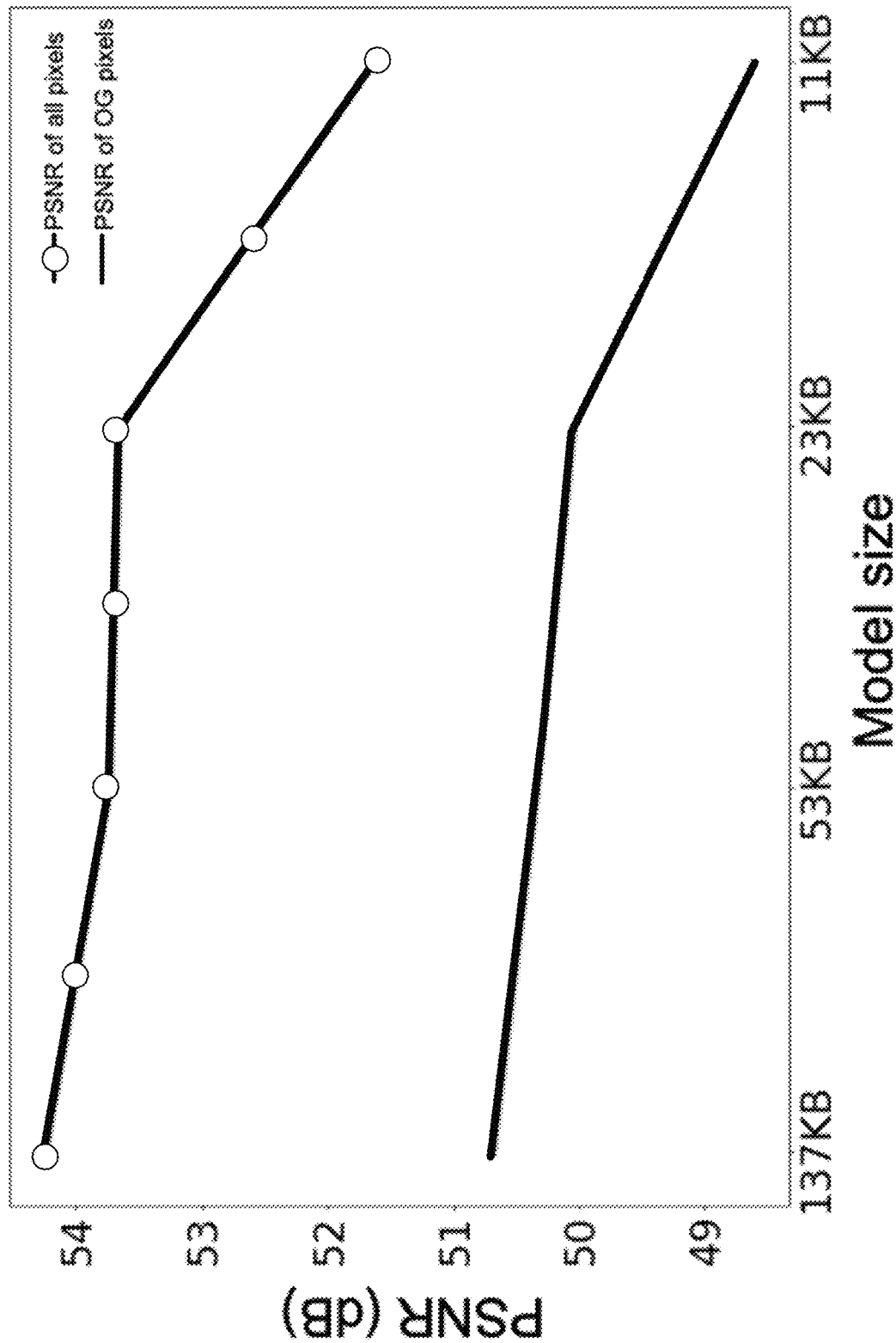

FIG. 6A illustrates the results of an ablation study. For example, FIG. 6A shows results of the gamut recovery system 102 predicting pixel values based on varied number of hidden neurons. In particular, FIG. 6A shows the PSNR of all pixel values and the PSNR of out-of-gamut pixel values by varying the model size of the MLP. As an example, FIG. 6A illustrates accuracy and optimization results based on a varied number of hidden neurons utilized within an MLP. To illustrate, FIG. 6A shows a fast MLP with model sizes that range from 137 KB to 11 KB. Further, as illustrated, as the model size decreases for each of the MLPs, the PSNR decreases. Moreover, the line plot shown in FIG. 6A shows that the 23 KB MLP provided the most optimal and accurate results for model size. Accordingly, FIG. 6A indicates that increasing the model size of the MLP increases accuracy and optimization time, while decreasing the model size decreases the metadata size.

FIG. 6B illustrates the results of another ablation study. For example, FIG. 6B shows results of the gamut recovery system 102 predicting pixel values based on various inputs. In particular, FIG. 6B shows an MLP utilizing inputs consisting of spatial coordinates, an MLP utilizing clipped pixel values (e.g., RGB), and an MLP utilizing both spatial coordinates and clipped pixel values (e.g., RGB). To illustrate, for the MLPs respectively, FIG. 6B shows a PSNR of 48.57, 51.10, and 53.65.

FIG. 6B shows that in one or more examples, varying the inputs to the MLP increases the accuracy of the predicted pixel values. In particular, as mentioned, FIG. 6B shows a lower accuracy for MLPs only utilizing spatial coordinates, a higher accuracy for MLPs utilizing only pixel values, and the highest accuracy for MLPs utilizing both spatial coordinates and pixel values.

In addition to the above discussed qualitative and quantitative testing and testing, as previously mentioned, the gamut recovery system 102 utilizes pre-trained MLPs. For example, the gamut recovery system 102 utilizes pre-trained MLP initialization to increase the speed of optimization. In particular, the gamut recovery system 102 pre-trains a MLP with model parameters configured for initialization. In effect, the pre-training of the MLP aids in spatial coordinate based MLPs to converge faster during optimization. For instance, the gamut recovery system 102 pre-trains the MLP utilizing images from a training dataset. Moreover, for each meta epoch (e.g., an entire dataset passed forward and backwards through the MLP once) the meta-MLP fits each digital image with 20 epochs utilizing a larger learning rate of 1e-2 and a stochastic gradient descent optimizer. Furthermore, when the gamut recovery system 102 initializes with a pre-trained MLP, the optimization only utilizes 10 epochs, thus increasing the efficiency of optimization.

Figure 7:
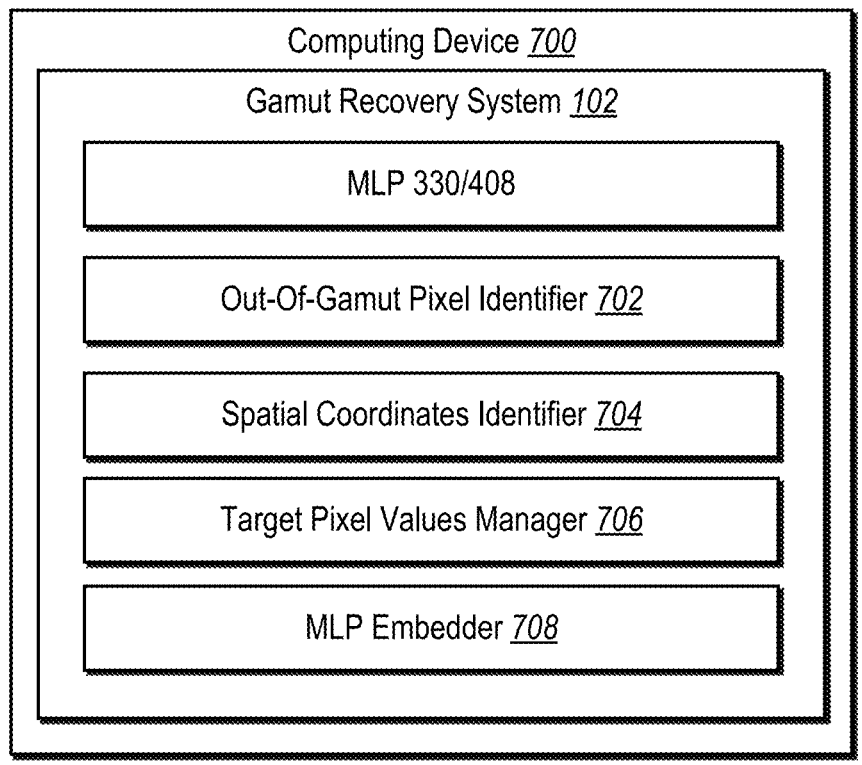
FIG. 7 illustrates an example schematic diagram of the gamut recovery system in accordance with one or more embodiments.

Turning to FIG. 7, additional detail will now be provided regarding various components and capabilities of the gamut recovery system 102. In particular, FIG. 7 illustrates an example schematic diagram of a computing device 700 (e.g., the server(s) 104 and/or the client device 108) implementing the gamut recovery system 102 in accordance with one or more embodiments of the present disclosure. Each of the components 702-708 of the gamut recovery system 102 can include software, hardware, or both. For example, the components 702-708 can include one or more instructions stored on a computer-readable storage medium and executable by processors of one or more computing devices, such as a client device or server device. When executed by the one or more processors, the computer-executable instructions of the gamut recovery system 102 can cause the computing device(s) to perform the methods described herein. Alternatively, the components 702-708 can include hardware, such as a special-purpose processing device to perform a certain function or group of functions. Alternatively, the components 702-708 of the gamut recovery system 102 can include a combination of computer-executable instructions and hardware. As illustrated in FIG. 7, the gamut recovery system 102 includes the MLP 330/408, an out-of-gamut pixel identifier 702, a spatial coordinates identifier 704, a target pixel values manager 706, and an MLP embedder 708.

The out-of-gamut pixel identifier 702 identifies out-of-gamut pixel values of a digital image. For example, the gamut recovery system 102 receives a digital image with a gamut and reduces the gamut to a smaller gamut, then expands the gamut to identify out-of-gamut pixel values. In particular, the out-of-gamut pixel identifier 702 identifies pixel values and passes the pixel values to the gamut recovery system 102.

The spatial coordinates identifier 704 identifies spatial coordinates corresponding to the out-of-gamut pixel values of a digital image. For example, based on the identification of the out-of-gamut pixel identifier 702, the spatial coordinates identifier 704 also identifies corresponding spatial coordinates. In tandem, the spatial coordinates identifier 704 and the out-of-gamut pixel identifier 702 passes the identified values to the gamut recovery system 102.

The target pixel values manager 706 determines target pixel values. For example, the target pixel values manager 706 determines target pixel values of a target version of the digital image in a gamut without the target pixel values. In particular, the target pixel values manager 706 utilizes a baseline digital image (e.g., a target version of the digital image) to determine target pixel values. Furthermore, the target pixel values manager 706 passes values to the gamut recovery system 102.

The MLP embedder 708 embeds the MLP within the digital image of a smaller gamut. For example, the gamut recovery system 102 converts a target version of the digital image to a smaller gamut digital image and the MLP embedder 708 embeds the MLP within the metadata of the digital image. The gamut recovery system 102 later extracts the MLP from the digital image for gamut expansion.

Furthermore, the components 702-708 of the gamut recovery system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-708 of the gamut recovery system 102 may be implemented as a stand-alone application, such as a desktop or mobile application. Furthermore, the components 802-808 of the gamut recovery system 102 may be implemented as one or more web-based applications hosted on a remote server. Alternatively, or additionally, the components 802-808 of the gamut recovery system 102 may be implemented in a suite of mobile device applications or "apps." For example, in one or more embodiments, the gamut recovery system 102 can comprise or operate in connection with digital software applications such as ADOBE® CREATIVE CLOUD EXPRESS, ADOBE® PHOTOSHOP®, ADOBE® INDESIGN®, or ADOBE® ILLUSTRATOR®. "ADOBE," "PHOTOSHOP," "INDESIGN," and "ILLUSTRATOR" are either registered trademarks or trademarks of Adobe Inc. in the United States and/or other countries.

Figure 8:
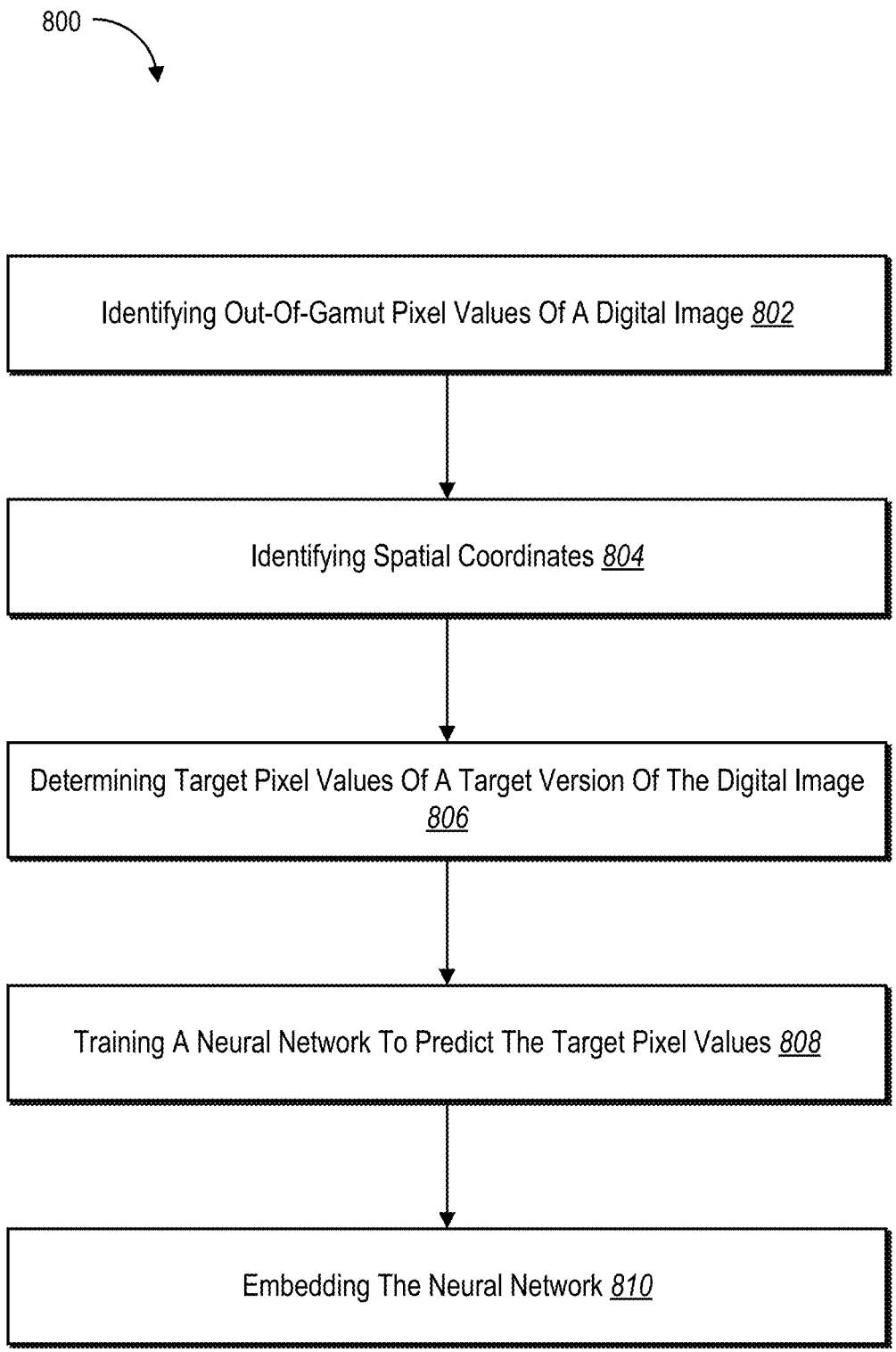
FIG. 8 illustrates a flowchart of a series of acts for identifying out-of-gamut pixel values and training a multi-layer perceptron in accordance with one or more embodiments.

FIGS. 1-7, the corresponding text, and the examples provide a number of different methods, systems, devices, and non-transitory computer-readable media of the gamut recovery system 102. In addition to the foregoing, one or more embodiments can also be described in terms of flowcharts comprising acts for accomplishing the particular result, as shown in FIG. 8. FIG. 8 may be performed with more or fewer acts. Further, the acts may be performed in different orders. Additionally, the acts described herein may be repeated or performed in parallel with one another or in parallel with different instances of the same or similar acts.

FIG. 8 illustrates a flowchart of a series of acts 800 for training a multi-layer perceptron for color restoration and embedding the multi-layer perceptron within a digital image. FIG. 8 illustrates acts according to one embodiment, alternative embodiments may omit, add to, reorder, and/or modify any of the acts shown in FIG. 8. In some implementations, the acts of FIG. 8 are performed as part of a method. For example, in some embodiments, the acts of FIG. 8 are performed as part of a computer-implemented method. Alternatively, a non-transitory computer-readable medium can store instructions thereon that, when executed by at least one processor, cause a computing device to perform the acts of FIG. 8. In some embodiments, a system performs the acts of FIG. 8. For example, in one or more embodiments, a system includes at least one memory device comprising a gamut recovery system 102 corresponding to a plurality of computing devices of a suite of software applications. The system further includes at least one server device configured to cause the system to perform the acts of FIG. 8.

The series of acts 800 includes an act 802 for identifying out-of-gamut pixel values of a digital image. For example, the act 802 includes identifying out-of-gamut pixel values of a digital image in a first gamut, wherein the digital image is converted to the first gamut from a second gamut. For instance, in one or more embodiments, the act 802 involves identifying a range for the digital image in the second gamut, generating a matrix, with the identified range, that maps between the target version of the digital image and the digital image in the second gamut, and identifying out-of-gamut pixel of the digital image in the second gamut based on the identified range and the generated matrix.

The act 802 includes identifying pixel values of the digital image in the second gamut within a determined range indicating out-of-gamut pixel values. Additionally, the act 802 includes converting the target version of the digital image to the second gamut and clipping pixel values within the determined range of the second gamut. Furthermore, the act 802 includes clipping pixel values within the identified range with at least one of hard-clipping or soft-clipping. Moreover, the act 802 includes performing a hard-clipping operation on pixel values within the identified range and processing the pixel values within the identified range with a gamma encoding function.

Additionally, the series of acts 800 includes an act 804 of identifying spatial coordinates. The act 804 includes, identifying spatial coordinates of the out-of-gamut pixel values. The series of acts 800 also includes an act 806 of determining target pixel values of a target version of the digital image. The act 806 includes determining target pixel values of a target version of the digital image in the first gamut that correspond to the out-of-gamut pixel values.

Further, the series of acts 800 includes an act 808 of training a neural network to predict the target pixel values. The act 808 includes training a neural network to predict the target pixel values in the first gamut from the out-of-gamut pixel values and the spatial coordinates of the out-of-gamut pixel values. The act 808 also includes training the neural network specific for the target version of the digital image. Further, the act 808 includes performing a least square errors (L2) loss function between the predicted target pixel values and the target version of the digital image. Additionally, the act 808 includes updating parameters in one or more of fully connected layers. Moreover, the act 808 includes updating parameters of a pre-trained meta-multi-layer perceptron model. Further, the pre-trained meta-multi-layer perceptron model comprises passing an encoded a multi-dimensional feature vector to the pre-trained multi-layer perceptron comprising two fully connected layers.

Additionally, the series of acts 800 includes an act 810 of embedding the neural network. The act 810 includes embedding the neural network within a metadata field of the digital image in the second gamut. The series of acts 800 further includes converting the digital image in the second gamut to the first gamut by utilizing an inverse transform operation. Moreover, the series of acts 800 includes converting a digital image in a second gamut to a first gamut utilizing an inverse transform operation, identifying out-of-gamut pixel values of the digital image in a first gamut, identifying spatial coordinates of the out-of-gamut pixel values, determining target pixel values of a target version of the digital image in the first gamut that correspond to the out-of-gamut pixel values, training an image-specific neural network to predict the target pixel values in the first gamut from the out-of-gamut pixel values and the spatial coordinates of the out-of-gamut pixel values, and embedding the image-specific neural network within a metadata field of the digital image in the second gamut.

Figure 9:
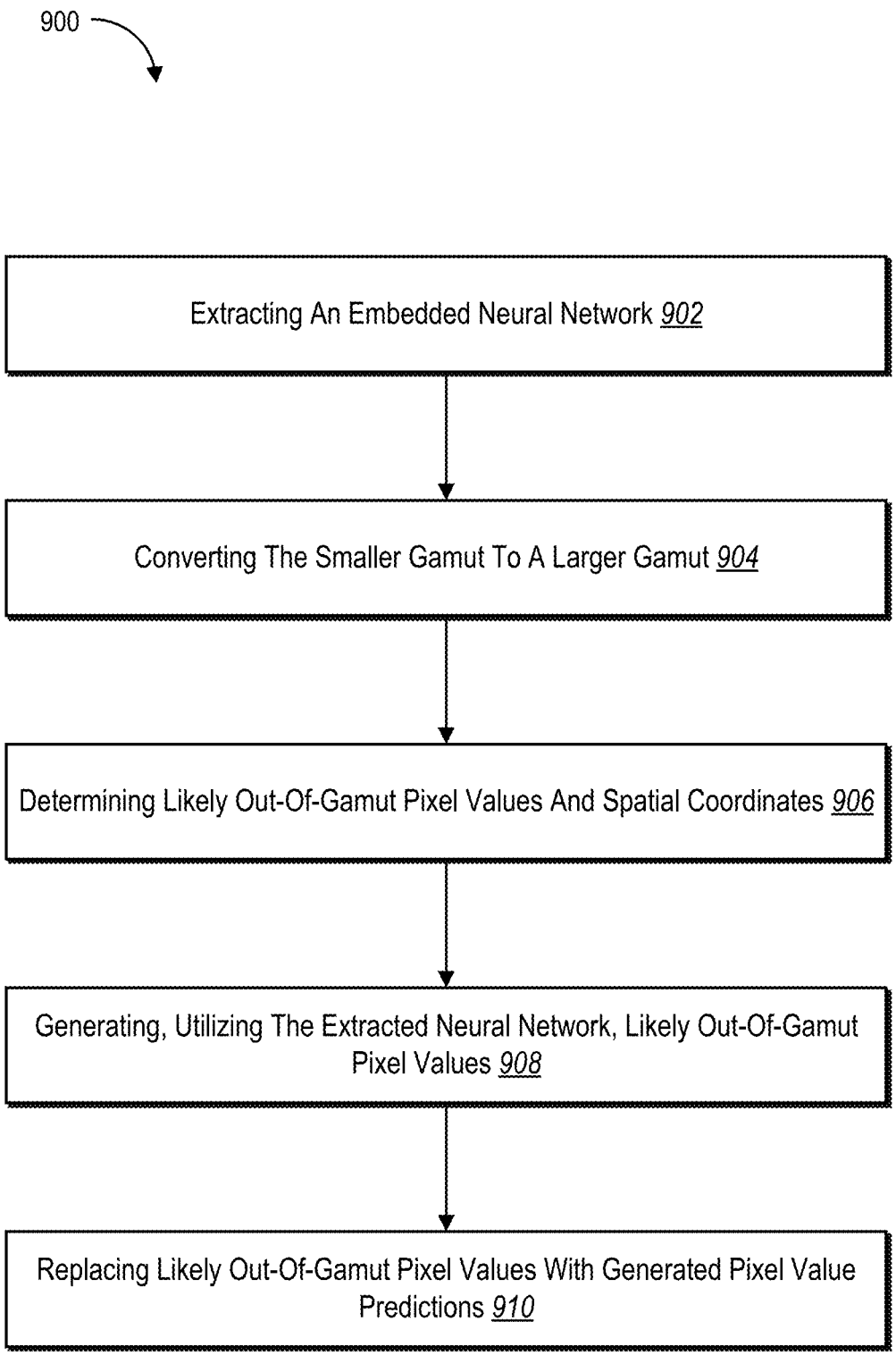
FIG. 9 illustrates a flowchart of a series of acts for extracting an embedded neural network from a smaller gamut digital image and generating pixel value predictions in accordance with one or more embodiments.

FIG. 9 illustrates a flowchart of a series of acts 900 for utilizing an embedded neural network (e.g., MLP) to perform color restoration. FIG. 9 illustrates acts according to one embodiment, alternative embodiments may omit, add to, reorder, and/or modify any of the acts shown in FIG. 9. In some implementations, the acts of FIG. 9 are performed as part of a method. For example, in some embodiments, the acts of FIG. 9 are performed as part of a computer-implemented method. Alternatively, a non-transitory computer-readable medium can store instructions thereon that, when executed by at least one processor, cause a computing device to perform the acts of FIG. 9. In some embodiments, a system performs the acts of FIG. 9. For example, in one or more embodiments, a system includes at least one memory device comprising a gamut recovery system 102 corresponding to a plurality of computing devices of a suite of software applications. The system further includes at least one server device configured to cause the system to perform the acts of FIG. 9.

The series of acts 900 includes an act 902 for extracting an embedded neural network. For example, the act 902 includes, extracting from a smaller gamut digital image, an embedded neural network. The series of acts 900 also includes an act 904 of converting the smaller gamut to a larger gamut. For example, the act 904 includes converting the smaller gamut digital image to a larger gamut digital image by performing an inverse transform to convert the smaller gamut digital image to the larger gamut digital image.

The series of acts 900 includes an act 906 of determining likely out-of-gamut pixel values and spatial coordinates. For example, the act 906 includes determining likely out-of-gamut pixel values and spatial coordinates of the likely out-of-gamut pixel values. The act 906 further includes generating an out-of-gamut mask from the smaller gamut digital image. Moreover, the act 906 includes identifying saturated channel pixel values within the smaller gamut digital image.

The series of acts 900 includes an act 908 of generating, utilizing the extracted neural network, likely out-of-gamut pixel values. For example, the act 908 includes generating, utilizing the extracted neural network, pixel value predictions corresponding to the determined likely out-of-gamut pixel values and spatial coordinates of the likely out-of-gamut pixel values. The act 908 includes predicting residual values for the pixel value predictions corresponding to the determined likely out-of-gamut pixel values to add to the digital image in the larger gamut to restore the larger gamut digital image. Moreover, the act 908 includes generating, utilizing at least one of a sine or cosine function, position informed encodings from the likely out-of-gamut pixel values and spatial coordinates of the likely out-of-gamut pixel values and generating the position informed encodings comprises processing the position informed encodings utilizing the neural network.

The series of acts 900 further includes an act 910 of replacing likely out-of-gamut pixel values with generated pixel value predictions. For example, the act 910 includes replacing the likely out-of-gamut pixel values in the larger gamut digital image with the generated pixel value predictions.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
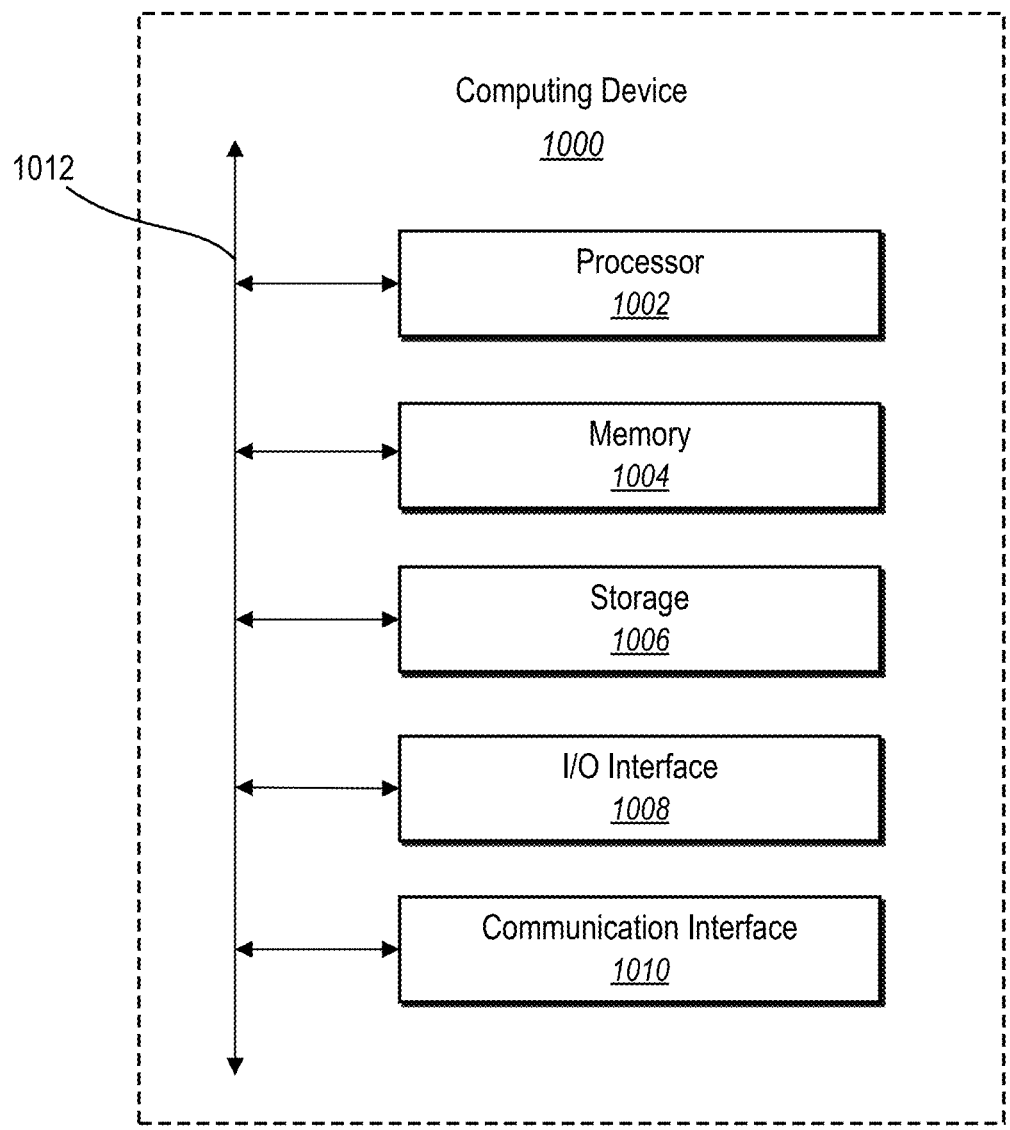
FIG. 10 illustrates a block diagram of an exemplary computing device in accordance with one or more embodiments.

FIG. 10 illustrates a block diagram of an example computing device 1000 configured to perform one or more of the processes described above. One will appreciate that one or more computing devices, such as the computing device 1000, represent the computing devices described above (e.g., the server(s) 104 and/or the client device 108). In one or more embodiments, the computing device 1000 is a mobile device (e.g., a mobile telephone, a smartphone, a PDA, a tablet, a laptop, a camera, a tracker, a watch, a wearable device). In some embodiments, the computing device 1000 is a non-mobile device (e.g., a desktop computer or another type of client device). Further, the computing device 1000 is a server device that includes cloud-based processing and storage capabilities in one or more implementations.

As shown in FIG. 10, the computing device 1000 includes one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 including storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
    identifying out-of-gamut pixel values of a digital image in a first gamut, wherein the digital image is converted to the first gamut from a second gamut;
    determining target pixel values of a target version of the digital image in the first gamut that correspond to the out-of-gamut pixel values;
    training a neural network to predict the target pixel values of the target version in the first gamut based on the out-of-gamut pixel values; and
    embedding the neural network within the digital image in the second gamut.

2. The method of claim 1, wherein training the neural network further comprises training the neural network specific to the digital image.

3. The method of claim 1, wherein embedding the neural network further comprises embedding the neural network within a metadata field of the digital image in the second gamut.

4. The method of claim 1, wherein identifying out-of-gamut pixel values of the digital image in the first gamut further comprises identifying pixel values of the digital image in the second gamut along a boundary of the second gamut.

5. The method of claim 4, further comprising converting the target version of the digital image to the second gamut by clipping pixel values of the target version of the digital image.

6. The method of claim 1, wherein training the neural network further comprises utilizing a loss function to compare the predicted target pixel values and corresponding pixel values in the target version of the digital image.

7. The method of claim 1, wherein the neural network comprises a multi-layer perceptron.

8. A system comprising:
    one or more memory components; and
    one or more processing devices coupled to the one or more memory components, the one or more processing devices configured to cause the system to:
        convert a digital image in a second gamut to a first gamut utilizing an inverse transform operation;
        identify out-of-gamut pixel values of the digital image in a first gamut;
        identify spatial coordinates of the out-of-gamut pixel values;
        determine target pixel values of a target version of the digital image in the first gamut that correspond to the out-of-gamut pixel values;
        train an image-specific neural network to predict the target pixel values in the first gamut from the out-of-gamut pixel values and the spatial coordinates of the out-of-gamut pixel values; and
        embed the image-specific neural network within a metadata field of the digital image in the second gamut.

9. The system of claim 8, wherein the one or more processing devices are configured to train the image-specific neural network by updating parameters in one or more fully connected layers of the image-specific neural network.

10. The system of claim 8, wherein the one or more processing devices are further configured to train the image-specific neural network by updating parameters of a pre-trained multi-layer perceptron.

11. The system of claim 10, wherein the pre-trained multi-layer perceptron comprises two fully connected layers.

12. The system of claim 8, wherein the one or more processing devices are configured to identify the out-of-gamut pixel values of the digital image in the first gamut by:
    identifying a gamut range for the digital image in the second gamut; and
    identifying out-of-gamut pixel of the digital image in the second gamut based on the identified gamut range.

13. The system of claim 12, wherein the one or more processing devices are further configured to clip pixel values within the identified gamut range with at least one of hard-clipping or soft-clipping.

14. The system of claim 12, wherein the one or more processing devices are configured to embed the image-specific neural network within the metadata field of the digital image in the second gamut by embedding parameters of the image-specific neural network within the metadata field.

15. A non-transitory computer-readable medium storing executable instructions which, when executed by at least one processing device, cause the at least one processing device to perform operations comprising:
    extracting from a smaller gamut digital image an embedded neural network;
    converting the smaller gamut digital image to a larger gamut digital image;
    determining likely out-of-gamut pixel values and spatial coordinates of the likely out-of-gamut pixel values;
    generating, utilizing the extracted neural network, pixel value predictions corresponding to the determined likely out-of-gamut pixel values and spatial coordinates of the likely out-of-gamut pixel values; and
    replacing the likely out-of-gamut pixel values in the larger gamut digital image with the generated pixel value predictions.

16. The non-transitory computer-readable medium of claim 15, wherein the operations further comprise performing an inverse transform to convert the smaller gamut digital image to the larger gamut digital image.

17. The non-transitory computer-readable medium of claim 15, wherein determining likely out-of-gamut pixel values comprises generating an out-of-gamut mask from the smaller gamut digital image.

18. The non-transitory computer-readable medium of claim 15, wherein the operations further comprise predicting residual values for the pixel value predictions corresponding to the determined likely out-of-gamut pixel values to add to the out-of-gamut pixel values in the larger gamut to restore the larger gamut digital image.

19. The non-transitory computer-readable medium of claim 15, wherein:
    the operations further comprise generating, utilizing at least one of a sine or cosine function, position informed encodings from the likely out-of-gamut pixel values and spatial coordinates of the likely out-of-gamut pixel values; and
    generating the pixel value predictions comprises processing the position informed encodings utilizing the extracted neural network.

20. The non-transitory computer-readable medium of claim 15, wherein determining likely out-of-gamut pixel values comprises identifying saturated channel pixel values within the smaller gamut digital image.

* * * * *